United States Patent
Tsuboi et al.

(10) Patent No.: US 11,884,137 B2
(45) Date of Patent: Jan. 30, 2024

(54) CONTROL DEVICE FOR VEHICLE-MOUNTED COOLING SYSTEM, AND VEHICLE-MOUNTED COOLING SYSTEM

(71) Applicant: DENSO CORPORATION, Kariya (JP)

(72) Inventors: Yoshiki Tsuboi, Kariya (JP); Kousuke Baba, Kariya (JP)

(73) Assignee: DENSO CORPORATION, Kariya (JP)

( * ) Notice: Subject to any disclaimer, the term of this patent is extended or adjusted under 35 U.S.C. 154(b) by 193 days.

(21) Appl. No.: 17/335,415

(22) Filed: Jun. 1, 2021

(65) Prior Publication Data

US 2021/0283991 A1   Sep. 16, 2021

Related U.S. Application Data

(63) Continuation of application No. PCT/JP2019/045989, filed on Nov. 25, 2019.

(30) Foreign Application Priority Data

Nov. 29, 2018   (JP) ................................. 2018-224234
Oct. 29, 2019   (JP) ................................. 2019-196040

(51) Int. Cl.
 *E05B 65/06*   (2006.01)
 *B60H 1/32*    (2006.01)
 *B60H 1/00*    (2006.01)

(52) U.S. Cl.
 CPC ....... *B60H 1/3225* (2013.01); *B60H 1/00278* (2013.01); *B60H 2001/00307* (2013.01);
 (Continued)

(58) Field of Classification Search
 CPC .............. B60H 1/3225; B60H 1/00278; B60H 2001/00307; B60H 2001/3248; B60H 2001/3255; B60H 2001/3266
 (Continued)

(56) References Cited

U.S. PATENT DOCUMENTS

2014/0290289 A1   10/2014   Ohno et al.

FOREIGN PATENT DOCUMENTS

JP   2005005087       *  1/2005
JP   2013047488 A1    *  4/2013
(Continued)

OTHER PUBLICATIONS

Dec. 24, 2019 International Search Report issued in International Patent Application No. PCT/JP2019/045989.

*Primary Examiner* — Davis D Hwu
(74) *Attorney, Agent, or Firm* — Oliff PLC

(57) ABSTRACT

A vehicle-mounted cooling system includes an air-conditioning refrigerant circuit including a refrigerant passage, a compressor, a heat source-side heat exchanger and a use-side heat exchanger, a battery, and a battery cooling unit cooling the battery using the refrigerant. A control device controls a drive state of the compressor in response to an air-conditioning request and a battery cooling request. The control device includes an abnormality determination unit configured to determine whether an abnormality has occurred in the air-conditioning refrigerant circuit, and a control mode change unit configured to perform, under a situation where the battery cooling request has occurred and it is determined that an abnormality has occurred in the air-conditioning refrigerant circuit, a change of a refrigerant-circulation control mode while permitting the battery cooling unit to continuously cool the battery based on the refrigerant, the refrigerant-circulation control mode representing how the refrigerant is circulated in the air-conditioning refrigerant circuit.

20 Claims, 11 Drawing Sheets

(52) U.S. Cl.
CPC ............... *B60H 2001/3248* (2013.01); *B60H 2001/3255* (2013.01); *B60H 2001/3266* (2013.01)

(58) Field of Classification Search
USPC .......................................................... 62/129
See application file for complete search history.

(56) References Cited

FOREIGN PATENT DOCUMENTS

| | | | |
|---|---|---|---|
| JP | WO2023047488 A1 * | 4/2013 | |
| JP | 2013-189118 A | 9/2013 | |
| JP | 2014-037181 A | 2/2014 | |
| JP | 2018-075922 A | 5/2018 | |

* cited by examiner

CONTROL DEVICE FOR VEHICLE-MOUNTED COOLING SYSTEM, AND VEHICLE-MOUNTED COOLING SYSTEM

CROSS-REFERENCE TO RELATED APPLICATION

The present application is a continuation application of International Application No. PCT/JP2019/045989, filed on Nov. 25, 2019, which claims priority to Japanese Patent Application No. 2018-224234 filed on Nov. 29, 2018, and Japanese Patent Application No. 2019-196040 filed on Oct. 29, 2019. The contents of these applications are incorporated herein by reference in their entirety.

BACKGROUND

Technical Field

The present disclosure relates to a control device for a vehicle-mounted cooling system, and a vehicle-mounted cooling system.

Background Art

In related art, a technique of cooling a battery by utilizing a refrigerant which circulates in an air-conditioning refrigerant circuit of a vehicle, which performs air conditioning inside a passenger compartment, has been proposed. Further, measures have been proposed against concern about degradation of a battery due to excessive rise of a battery temperature when the battery cannot be cooled due to occurrence of an abnormality in a cooling system which cools the battery.

SUMMARY

In the present disclosure, provided is a control device as the following.

The control device for controlling, in response to an air-conditioning request and a battery cooling request, a drive state of a compressor included in an air-conditioning refrigerant circuit of a vehicle-mounted cooling system, the air-conditioning refrigerant circuit including, in addition to the compressor, a refrigerant passage in which the refrigerant circulates, a heat source-side heat exchanger, and a use-side heat exchanger, the vehicle-mounted cooling system including, in addition to the air-conditioning refrigerant circuit, a battery and a battery cooling unit, the control device includes: an abnormality determination unit configured to determine whether an abnormality has occurred in the air-conditioning refrigerant circuit; and a control mode change unit configured to perform, under a situation where the battery cooling request has occurred and it is determined that an abnormality has occurred in the air-conditioning refrigerant circuit, a change of a refrigerant-circulation control mode while permitting the battery cooling unit to continuously cool the battery based on the circulated refrigerant, the refrigerant-circulation control mode representing how the refrigerant is circulated in the air-conditioning refrigerant circuit.

BRIEF DESCRIPTION OF THE DRAWINGS

The above and other objects, features and advantages of the present disclosure will become clearer from the following detailed description with reference to the accompanying drawings, in which.

DETAILED DESCRIPTION OF THE PREFERRED EMBODIMENTS

Figure 1:
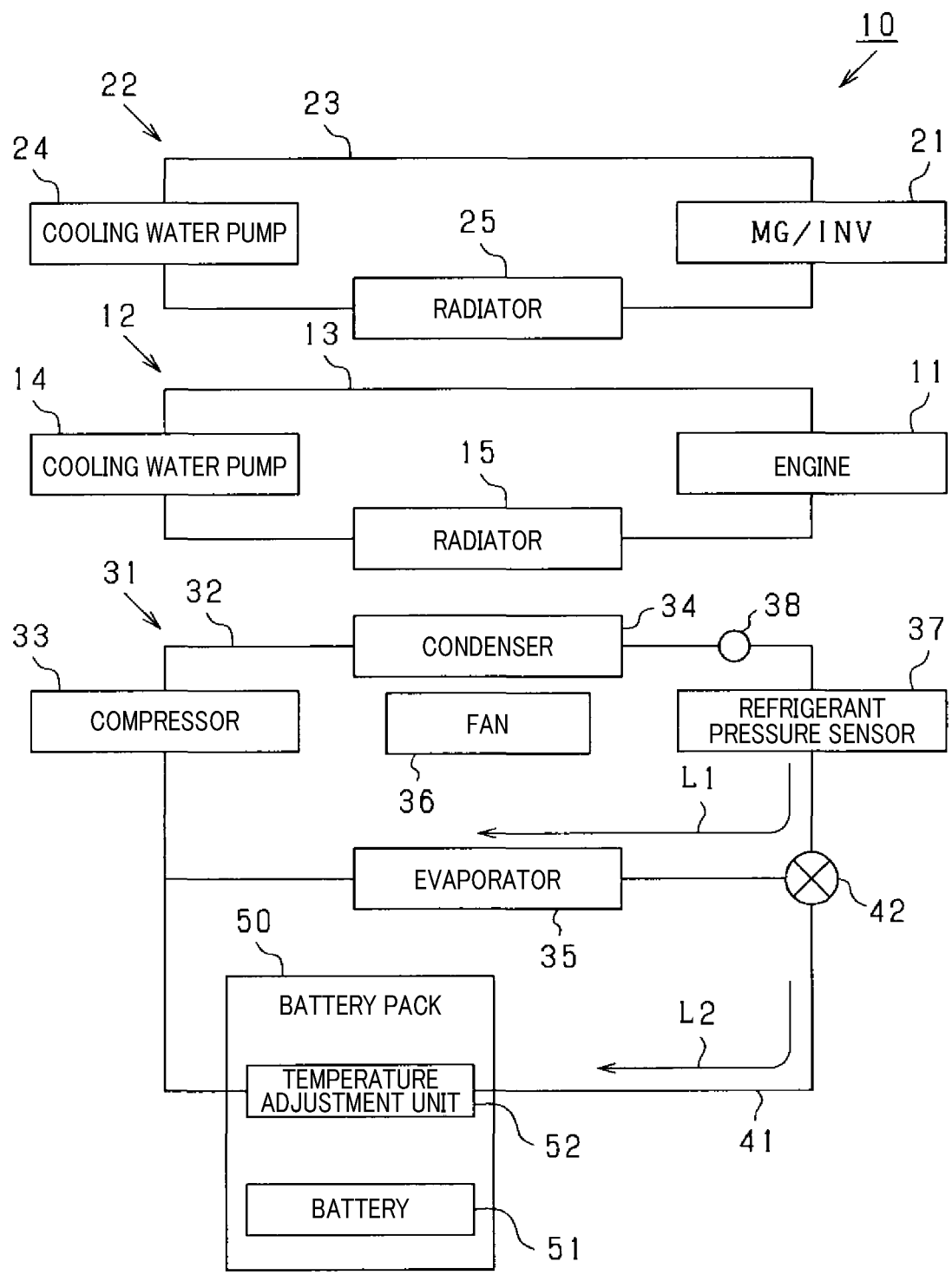
FIG. 1 is a configuration diagram illustrating a cooling water circuit and an air-conditioning refrigerant circuit in a vehicle.

For example, a technique disclosed in PTL 1 employs a configuration where a refrigerant loop for a battery which cools a battery using a refrigerant for a battery is provided in a thermal management system for a vehicle used in an electric vehicle, and a heat exchanger which causes heat exchange between air inside a drafter for ventilation which discharges air inside a passenger compartment to outside of the passenger compartment and the refrigerant for the battery is provided in the refrigerant loop for the battery. Further, a switching means enables a state of the refrigerant loop for the battery to be switched between a state where the refrigerant for the battery flows through the heat exchanger and a state where the refrigerant for the battery bypasses the heat exchanger. Then, in a case where a compressor (compression unit) cannot compress a refrigerant for an air conditioner, heat of the refrigerant for the battery is released to air inside the drafter by the heat exchanger by switching the state of the refrigerant loop for the battery to the state where the refrigerant for the battery flows through the heat exchanger, to thereby prevent rise in the temperature of the battery in a case where the compressor has failed.

[PTL 1] JP 2014-37181 A

However, in the technique in the above-described PTL 1, it is essential that the heat exchanger which causes heat exchange between air inside the drafter for ventilation and the refrigerant for the battery be provided in the refrigerant loop for the battery as a measure for mitigating occurrence of an abnormality in the cooling system, which brings a concern that a problem such as increase in a physical size due to addition of parts arises. Further, as abnormalities in the cooling system, abnormalities in respective parts in the air-conditioning refrigerant circuit as well as abnormalities in the compressor should be considered. For example, a heat dissipation fan may be provided at a condensing unit (condenser) which condenses the refrigerant for the air conditioner, and in a case where the heat dissipation fan has failed, heat dissipation performance for the condenser degrades. The battery is expected to be continuously cooled even in a state where such a failure, or the like, of the heat dissipation fan has occurred.

The present disclosure has been made in view of the above-described problems, and a main object of the present disclosure is to provide a control device of a vehicle-mounted cooling system, and a vehicle-mounted cooling system, which can appropriately cool a battery upon occurrence of an abnormality in an air-conditioning refrigerant circuit while achieving a simpler configuration.

Means for solving the above-described problems and operational effects will be described below.

A first aspect is a control device for controlling, in response to an air-conditioning request and a battery cooling request, a drive state of a compressor that compresses a refrigerant and is included in an air-conditioning refrigerant circuit of a vehicle-mounted cooling system, the air-conditioning refrigerant circuit including, in addition to the compressor, a refrigerant passage in which the refrigerant circulates, a heat source-side heat exchanger, and a use-side heat exchanger, the vehicle-mounted cooling system including, in addition to the air-conditioning refrigerant circuit, a battery that supplies power to a vehicle-mounted electric component, and a battery cooling unit that cools the battery using the refrigerant circulated in the refrigerant passage, the control device comprising:

an abnormality determination unit configured to determine whether an abnormality has occurred in the air-conditioning refrigerant circuit; and a control mode change unit configured to perform, under a situation where the battery cooling request has occurred and it is determined that an abnormality has occurred in the air-conditioning refrigerant circuit, a change of a refrigerant-circulation control mode while permitting the battery cooling unit to continuously cool the battery based on the circulated refrigerant, the refrigerant-circulation control mode representing how the refrigerant is circulated in the air-conditioning refrigerant circuit.

In the vehicle-mounted cooling system, for example, in a case where an abnormality of the air-conditioning refrigerant circuit has occurred due to a failure representing the heat dissipation fan being stopped or output of the heat dissipation fan being reduced, or the like, if circulation of the refrigerant stops in the air-conditioning refrigerant circuit, the battery cannot be cooled using the refrigerant circulated in the refrigerant passage, which has a risk that the battery temperature may rise excessively. Regarding this point, according to the above-described configuration, under a situation where the battery cooling request has occurred and it is determined that an abnormality has occurred in the air-conditioning refrigerant circuit, a change of a refrigerant-circulation control mode is performed while permitting the battery cooling unit to continuously cool the battery based on the circulated refrigerant, the refrigerant-circulation control mode representing how the refrigerant is circulated in the air-conditioning refrigerant circuit. In this case, even if an abnormality has occurred in the air-conditioning refrigerant circuit, it is possible to circulate the refrigerant in a mode in accordance with occurrence of the abnormality. As a result, it is possible to appropriately cool the battery upon occurrence of an abnormality in the air-conditioning refrigerant circuit while achieving a simpler configuration.

Note that control of circulation of the refrigerant in the air-conditioning refrigerant circuit includes, for example, control of driving of the compressor, and control of such as an expansion valve which adjusts an amount of the refrigerant circulating in the refrigerant passage. Change of the control mode includes, for example, change of rotation speed of the compressor, and change of the amount of the circulating refrigerant by the expansion valve.

In a second aspect, the control mode change unit is configured to perform, as the change of the refrigerant-circulation control mode, restriction of a rise in a pressure of the refrigerant in the refrigerant passage as compared with before it is determined that an abnormality has occurred, in the first aspect.

In a case where an abnormality has occurred in the air-conditioning refrigerant circuit in the vehicle-mounted cooling system, for example, the pressure of the refrigerant inside the refrigerant passage rises as heat dissipation performance at a condensing unit (condenser) in the air-conditioning refrigerant circuit degrades, which has a risk that piping which forms the refrigerant passage may be damaged. Regarding this point, according to the above-described configuration, in a case where the battery cooling request has occurred and it has been determined that an abnormality has occurred in the air-conditioning refrigerant circuit, rise in the pressure of the refrigerant in the refrigerant passage is restricted as compared with before the abnormality occurs, as change of the control mode. By this means, it is possible to continuously cool the battery while protecting the piping which forms the refrigerant passage, or the like, upon occurrence of an abnormality in the air-conditioning refrigerant circuit.

In a third aspect, the control mode change unit is configured to: perform, as the change of the refrigerant-circulation control mode, a restriction of a rise in a pressure of the refrigerant in the refrigerant passage, and perform a restriction of driving of the compressor to thereby prevent the pressure of the refrigerant in the refrigerant passage from rising beyond a predetermined high-pressure upper limit value, in the first aspect or the second aspect.

According to the above-described configuration, the pressure of the refrigerant inside the refrigerant passage is prevented from rising beyond the predetermined high-pressure upper limit value by restriction on driving of the compressor. By this means, it is possible to appropriately protect piping which forms the refrigerant passage, or the like.

In a fourth aspect, the control device further includes an air-conditioning restriction unit configured to perform restriction of air conditioning carried out by the air-conditioning refrigerant circuit when the control mode change unit performs, as the change of the refrigerant-circulation control mode, the restriction of the rise in the pressure of the refrigerant in the refrigerant passage, in the second aspect or the third aspect.

According to the above-described configuration, in a case where rise in the pressure of the refrigerant in the refrigerant passage is restricted in association with occurrence of an abnormality in the air-conditioning refrigerant circuit, air conditioning carried out by the air-conditioning refrigerant circuit is restricted. In this case, for example, under a situation where both the air-conditioning request and the battery cooling request have occurred, the battery cooling request is prioritized. In other words, the refrigerant is circulated in the refrigerant passage to cool the battery. By this means, it is possible to suitably prevent degradation of the battery in association with excessive rise of the battery temperature.

In a fifth aspect, the refrigerant passage includes a bypass passage provided in parallel to the use-side heat exchanger, the bypass passage enabling the refrigerant to be supplied to the battery cooling unit therethrough, the refrigerant passage includes a first circulation path that includes the use-side heat exchanger, and a second circulation path that includes the bypass passage that bypasses the use-side heat exchanger, the refrigerant passage being configured to select at least one of the first circulation path and the second circulation path through which the refrigerant flows; and the air-conditioning restriction unit is configured to perform, as the restriction of the air-conditioning, a task of causing the refrigerant to flow through the second circulation path while restricting flow of the refrigerant through the first circulation path, in the fourth aspect.

According to the above-described configuration, in a case where restriction on air conditioning is performed in a state where cooling by the battery cooling unit is prioritized in association with occurrence of an abnormality in the air-conditioning refrigerant circuit, as the restriction on air conditioning, the refrigerant flows through the second circulation path including the bypass passage (battery cooling unit), and flow of the refrigerant through the first circulation path including the use-side heat exchanger is restricted. In this case, it is possible to suitably cool the battery while restricting air conditioning by inhibiting heat exchange at the use-side heat exchanger.

In a sixth aspect 6, the air-conditioning restriction unit is configured to perform the restriction of the air-conditioning while adjusting, based on a temperature of the battery, (i) an amount of a part of the refrigerant that flows through the first circulation path; and (ii) an amount of a remaining part of the refrigerant that flows through the second circulation path, in the fifth aspect.

According to the above-described configuration, it is possible to suitably implement air conditioning as well as cooling the battery while taking into account a degree required for cooling the battery.

In a seventh aspect, the air-conditioning restriction unit is configured to perform, in response to determination that a traveling speed of a vehicle is higher than a predetermined speed threshold, one of: cancelling of the restriction of the air conditioning; and lowering of a degree of the restriction of the air conditioning, in any one of the fourth aspect to the sixth aspect.

In a case where the vehicle speed is higher, even if driving of the compressor is restricted as change of the refrigerant-circulation control mode, it is possible to implement air conditioning in addition to cooling of the battery as a result of heat exchange (heat dissipation) being performed using traveling wind at the heat source-side heat exchanger. In this case, for example, it is possible to switch from a state where air conditioning is stopped as the restriction of the air conditioning to a state where air conditioning is performed.

In an eighth aspect, the control mode change unit is configured to, while performing, as the change of the refrigerant-circulation control mode, the restriction of the rise in the pressure of the refrigerant, lower a degree of the restriction of the rise in the pressure of the refrigerant in response to determination that a traveling speed of a vehicle is higher than a predetermined first speed threshold; and the air-conditioning restriction unit is configured to lower a degree of the restriction of the air conditioning in response to determination that the traveling speed of the vehicle is higher than a second speed threshold that is higher than the first speed threshold, in any one of the fourth aspect to the sixth aspect.

According to the above-described configuration, the degree of restriction on the pressure of the refrigerant is lowered and the degree of the restriction of the air conditioning is lowered in accordance with a level of the vehicle speed. In this case, in a case where the vehicle speed increases, the degree of restriction on the pressure of the refrigerant is lowered first, and thereafter, the degree of the restriction of the air conditioning is lowered. It is therefore possible to implement appropriate air conditioning while prioritizing cooling of the battery upon occurrence of an abnormality in the air-conditioning refrigerant circuit.

In a nineth aspect, the control mode change unit is configured to, while performing the restriction of the rise in the pressure of the refrigerant, lower a degree of the restriction of the rise in the pressure of the refrigerant in response to determination that a traveling speed of a vehicle is higher than a predetermined speed threshold, in any one of the first aspect to the eighth aspect.

In a case where the vehicle speed is high, heat exchange (heat dissipation) is performed by traveling wind at the heat source-side heat exchanger, so that it is possible to lower the degree of restriction on the pressure of the refrigerant to increase the degree of cooling of the battery.

In a tenth aspect, the control device further includes a prediction unit configured to predict, under a situation where no battery cooling request has occurred and it is determined that an abnormality has occurred, whether the battery cooling request will occur based on a predicted future traveling of the vehicle from a present time, and the control mode change unit is configured to perform the change of the refrigerant-circulation control mode in response to determination that the battery cooling request will occur, in any one of the first aspect to the nineth aspect.

According to the above-described configuration, even under a situation where no battery cooling request has occurred upon occurrence of an abnormality, or the like, in the air-conditioning refrigerant circuit, it is possible to cool the battery in advance based on necessity of cooling of the battery at and after the present time. In this case, even if an amount of heat generation of the battery sharply rises in association with a sudden increase or the like in the electric load under a situation where an abnormality has occurred in the air-conditioning refrigerant circuit, it is possible to prevent the battery temperature from rising. In other words, even in a case where the temperature can rise due to insufficient cooling, it is possible to prevent the battery temperature from excessively rising during traveling. By this means, it is possible to protect the battery.

In a eleventh aspect, the electric equipment is a rotating electrical machine that serves as a power source for causing a vehicle to travel; and the first prediction unit is configured to predict whether the battery cooling request will occur based on a travel destination of the vehicle, in the tenth aspect.

For example, it is considered that drive load of the rotating electrical machine becomes higher and the battery temperature is more likely to rise in a case where the travel destination of the vehicle is far than in a case where the travel destination is near. Further, in a case where a traveling path to the travel destination includes an uphill road, it can be considered that the drive load on the rotating electrical machine becomes higher, and the battery temperature is likely to rise. In this case, by predicting whether the battery cooling request will occur, based on the travel destination of the vehicle, it is possible to suitably address rise of the battery temperature in association with abrupt change of the traveling load.

In a twelfth aspect, the control mode change unit is configured to: perform, as the change of the refrigerant-circulation control mode, the restriction of the rise in the pressure of the refrigerant in the refrigerant passage; and increase a degree of the restriction of the rise in the pressure of the refrigerant in response to determination that the battery cooling request will occur to be larger than that in response to determination that the battery cooling request has occurred, in the tenth aspect or the eleventh aspect.

According to the above-described configuration, by making the degree of restriction on the pressure of the refrigerant in the refrigerant passage larger in a case where it is predicted that the battery cooling request will occur, for example, rotation speed of the compressor is limited to a low rotation speed, and a degree of cooling of the battery is lowered. In this case, it is possible to appropriately cool the battery while preventing the battery from being excessively cooled and preventing air conditioning from being excessively restricted.

In a thirteenth aspect, the control mode change unit includes an air-conditioning restriction unit configured to perform, as the change of the refrigerant-circulation control mode, a restriction of air conditioning carried out by the air-conditioning refrigerant circuit, in the first aspect.

In a case where a leakage of the refrigerant has occurred as an abnormality in the air-conditioning refrigerant circuit, while it is considered that the capability of heat exchange in the air-conditioning refrigerant circuit is lowered, shortfall of cooling of the battery can be covered by restricting air conditioning. By this means, it is possible to cool the battery in a state which is as appropriate as possible upon occurrence of an abnormality.

In a fourteenth aspect, the air-conditioning restriction unit is configured to perform, under the situation where the battery cooling request and the air-conditioning request have occurred and it is determined that an abnormality has occurred in the air-conditioning refrigerant circuit, restriction of the air conditioning carried out by the air-conditioning refrigerant circuit, in the thirteenth aspect.

In this case, it is possible to appropriately restrict air conditioning while continuing cooling of the battery by taking into account a situation that the air-conditioning request and the battery cooling request have occurred and a drive state of the compressor.

In a fifteenth aspect, the control device further includes a prediction unit configured to predict, under a situation where at least one of the battery cooling request and the air-conditioning request has not occurred and it is determined that an abnormality has occurred, whether both the battery cooling request and the air-conditioning request will occur based on a predicted future traveling of the vehicle from a present time, and the control mode change unit is configured to permit the air-conditioning refrigerant circuit to carry out redundant air-conditioning that is redundant for presently needed air-conditioning, in the fourteenth aspect.

It is possible to predict that both an air-conditioning request and a battery cooling request will occur in the future from change of an outside air temperature at and after the present time and a traveling condition such as high-speed traveling while the vehicle is traveling. Further, it is also possible to predict that both the air-conditioning request and the battery cooling request in the future cannot be satisfied at a time point of occurrence of an abnormality in the air-conditioning refrigerant circuit. In this case, it is possible to improve the passenger compartment environment by carrying out redundant air-conditioning that is redundant for presently needed air-conditioning before both the air-conditioning request and the battery cooling request occur.

In a sixteenth aspect, the refrigerant passage includes a bypass passage provided in parallel to the use-side heat exchanger, the bypass passage enabling the refrigerant to be supplied to the battery cooling unit therethrough; the refrigerant passage includes a first circulation path that includes the use-side heat exchanger, and a second circulation path that includes the bypass passage that bypasses the use-side heat exchanger, the refrigerant passage being configured to select at least one of the first circulation path and the second circulation path through which the refrigerant flows; and the air-conditioning restriction unit is configured to perform, as the restriction of the air-conditioning, a task of causing the refrigerant to flow through the second circulation path while restricting flow of the refrigerant through the first circulation path, in one of the thirteenth aspect to the fifteenth aspect.

According to the above-described configuration, in a case where air conditioning is restricted in a state where cooling by the battery cooling unit is prioritized in association with occurrence of an abnormality in the air-conditioning refrigerant circuit, the refrigerant flows through the second circulation path including the bypass passage (battery cooling unit), and flow of the refrigerant through the first circulation path including the use-side heat exchanger is restricted as the restriction of the air conditioning. In this case, it is possible to suitably cool the battery while restricting air conditioning by inhibiting heat exchange by the use-side heat exchanger.

In a seventeenth aspect, the air-conditioning restriction unit is configured to perform the restriction of the air-conditioning while adjusting, based on a temperature of the battery, (i) an amount of a part of the refrigerant that flows through the first circulation path; and (ii) an amount of a remaining part of the refrigerant that flows through the second circulation path, in the sixteenth aspect.

According to the above-described configuration, it is possible to suitably implement air conditioning as well as cooling the battery while taking into account the degree of cooling required for the battery.

In an eighteenth aspect, the air-conditioning restriction unit is configured to perform, in response to determination that a traveling speed of a vehicle is higher than a predetermined speed threshold, one of: cancelling of the restriction of the air conditioning; and lowering of a degree of the restriction of the air conditioning, in any one of the thirteenth aspect to the seventeenth aspect.

In a case where the vehicle speed is high, as a result of heat exchange (heat dissipation) due to traveling wind performed by the heat source-side heat exchanger, even if driving of the compressor is restricted as change of the refrigerant-circulation control mode, air conditioning can be implemented in addition to cooling of the battery. In this case, it is possible to switch from, for example, a state where air conditioning is stopped as the restriction of the air conditioning to a state where the air conditioning is implemented.

In a nineteenth aspect, the control device further includes a parameter acquisition unit configured to acquire a drive state of the compressor or the pressure of the refrigerant in the refrigerant passage as a control parameter, and the control mode change unit changes the control mode based on the control parameter after the abnormality has occurred, in any one of the first aspect to the eighteenth aspect.

In a case where an abnormality has occurred in the air-conditioning refrigerant circuit, a state of heat exchange (state of heat dissipation) at the heat source-side heat exchanger is different from a normal state of the air-conditioning refrigerant circuit, and the drive state of the compressor and the pressure of the refrigerant inside the refrigerant passage change. In this case, by obtaining the change of the pressure of the refrigerant after the abnormality has occurred in the air-conditioning refrigerant circuit based on the control parameter indicating the drive state of the compressor or the pressure of the refrigerant inside the refrigerant passage and changing the refrigerant-circulation control mode in the air-conditioning refrigerant circuit, it is possible to cool the battery as appropriate in accordance with the drive state of the compressor and further in accordance with the pressure of the refrigerant.

In a twentieth aspect, the abnormality determination unit determines that an abnormality has occurred in the air-conditioning refrigerant circuit in response to at least one of a first abnormality, a second abnormality, and a third abnormality having occurring in the air-conditioning refrigerant circuit, the first abnormality representing a heat dissipation fan being stopped or output of the heat dissipation fan being reduced, the heat dissipation fan blowing air to the heat source-side heat exchanger, the second abnormality representing an abnormality of heat dissipation due to blockage of the heat source-side heat exchanger, and the third abnormality representing an abnormality due to a leakage of the refrigerant in the air-conditioning refrigerant circuit, in any one of the first aspect to the nineteenth aspect.

Possible causes of the abnormality occurring in the air-conditioning refrigerant circuit can include occurrence of a failure representing the heat dissipation fan being stopped or output of the heat dissipation fan being reduced, occurrence of an abnormality in heat dissipation due to blockage of the heat source-side heat exchanger, and occurrence of an abnormality due to a leakage of the refrigerant in the air-conditioning refrigerant circuit. Thus, by determining that an abnormality has occurred in the air-conditioning refrigerant circuit based on occurrence of an abnormality due to these causes, it is possible to appropriately detect occurrence of an abnormality and further suitably cool the battery upon occurrence of the abnormality.

In a vehicle-mounted cooling system including the air-conditioning refrigerant circuit, the battery, the battery cooling unit, and the control device according to any one of the first aspect to the twentieth aspect, it is possible to appropriately cool the battery upon occurrence of an abnormality in the air-conditioning refrigerant circuit while achieving a simpler configuration.

First Embodiment

Embodiments will be described below with reference to the drawings. The present embodiment is embodied as a vehicle-mounted cooling system which cools a battery which supplies power to a rotating electrical machine in a hybrid vehicle including an engine (internal combustion engine) and the rotating electrical machine as a power source. As is well known, a mode of the hybrid vehicle can be switched among an engine mode in which the vehicle travels using the engine as a traveling power source, an EV mode in which the vehicle travels using the rotating electrical machine as the traveling power source, and an HV mode in which the vehicle travels using the engine and the rotating electrical machine as the traveling power source, based on a vehicle traveling state.

FIG. 1 is a configuration diagram illustrating cooling water circuits 12 and 22 which cool an engine 11 and rotating electrical machine 21 in a vehicle 10, and an air-conditioning refrigerant circuit 31 using a refrigerant for air conditioning. In the present embodiment, the rotating electrical machine 21 corresponds to vehicle-mounted electric component.

As illustrated in FIG. 1, the vehicle 10 includes a first cooling water circuit 12 which cools the engine 11 and a second cooling water circuit 22 which cools the rotating electrical machine 21, as a cooling system using cooling water. The first cooling water circuit 12 includes a cooling water passage 13 which circulates engine cooling water, and a cooling water pump 14 and a radiator 15 which are provided in the cooling water passage 13. Further, the second cooling water circuit 22 includes a cooling water passage 23 which circulates motor cooling water, and a cooling water pump 24 and a radiator 25 which are provided in the cooling water passage 23. Note that the second cooling water circuit 22 may mainly cool an inverter which drives the rotating electrical machine 21 using battery power. However, the second cooling water circuit 22 may cool a heat generating part such as an armature winding in a body of the rotating electrical machine in addition to the inverter.

Further, in the vehicle 10, the air-conditioning refrigerant circuit 31 includes a refrigerant passage 32 which circulates a refrigerant such as a fluorocarbon refrigerant, an electrically operated compressor 33 which compresses the refrigerant, a condenser 34 which cools and liquifies the refrigerant, and an evaporator 35 which evaporates the refrigerant. Further, in the air-conditioning refrigerant circuit 31, a heat dissipation fan 36 blows air to the condenser 34 for dissipating heat from the condenser 34. The condenser 34 corresponds to a heat source-side heat exchanger, and the evaporator 35 corresponds to a use-side heat exchanger. An expansion valve 38 may be provided on a downstream side of the condenser 34 in the refrigerant passage 32. Further, a pressure of the refrigerant sensor 37 which detects a pressure of the refrigerant is provided in the refrigerant passage 32.

Note that the above-described respective cooling water circuits 12 and 22 can employ a configuration where the respective radiators 15 and 25 are integrated as a heat dissipation unit, or a configuration where the condenser 34 in addition to the respective radiators 15 and 25 are integrated as a heat dissipation unit, and the heat dissipation fan 36 may dissipate heat from these heat dissipation units.

In the present embodiment, the air-conditioning refrigerant circuit 31 is provided as a circuit which cools a battery 51 which supplies power to vehicle-mounted electric component as well as air conditioning (cooling and heating) inside a passenger compartment. The vehicle-mounted electric component includes the rotating electrical machine 21. The battery 51 is provided as a part of a battery pack 50, and a temperature adjustment unit 52 which adjusts a battery temperature is provided in the battery pack 50. The temperature adjustment unit 52 corresponds to a battery cooling unit which cools the battery 51 using the refrigerant circulated in the refrigerant passage through the refrigerant passage 32, and, for example, includes a heat exchange unit which cools the battery 51 through heat exchange with the refrigerant.

As a configuration regarding cooling of the battery, specifically, the refrigerant passage 32 includes a bypass passage 41 which is provided in parallel to the evaporator 35 on an upstream side of the compressor 33, and the temperature adjustment unit 52 of the battery pack 50 is provided in the bypass passage 41. Further, an electromagnetic valve 42 is provided in the refrigerant passage 32, and at least one of a first circulation path L1 and a second circulation path L2 through which the refrigerant flows is select by the electromagnetic valve 42, the first circulation path L1 includes the evaporator 35 and the second circulation path L2 includes the bypass passage 41 that bypasses the evaporator 35. This allows a state of the refrigerant passage 32 to be switched among a state where the refrigerant flows only through the first circulation path L1, a state where the refrigerant flows only through the second circulation path L2, and a state where the refrigerant flows through the first circulation path L1 and the second circulation path L2.

When the battery cooling is performed, the refrigerant is circulated through the bypass passage 41 by the state being switched to a state where the refrigerant flows only through the second circulation path L2, or a state where the refrigerant flows through the first circulation path L1 and the second circulation path L2. Further, in this case, the battery 51 is cooled through heat exchange at the temperature adjustment unit 52. Note that the temperature adjustment unit 52 may be configured to include a chiller which includes a circulation passage which circulates a thermic fluid such as cooling water, for example, the temperature adjustment unit 52 may include an evaporator provided on the bypass passage 41 and a circulation passage which circulates a thermic fluid (such as cooling water) cooled through heat exchange with the evaporator, and cool the battery 51 using the thermic fluid which circulates through the circulation passage.

Figure 2:
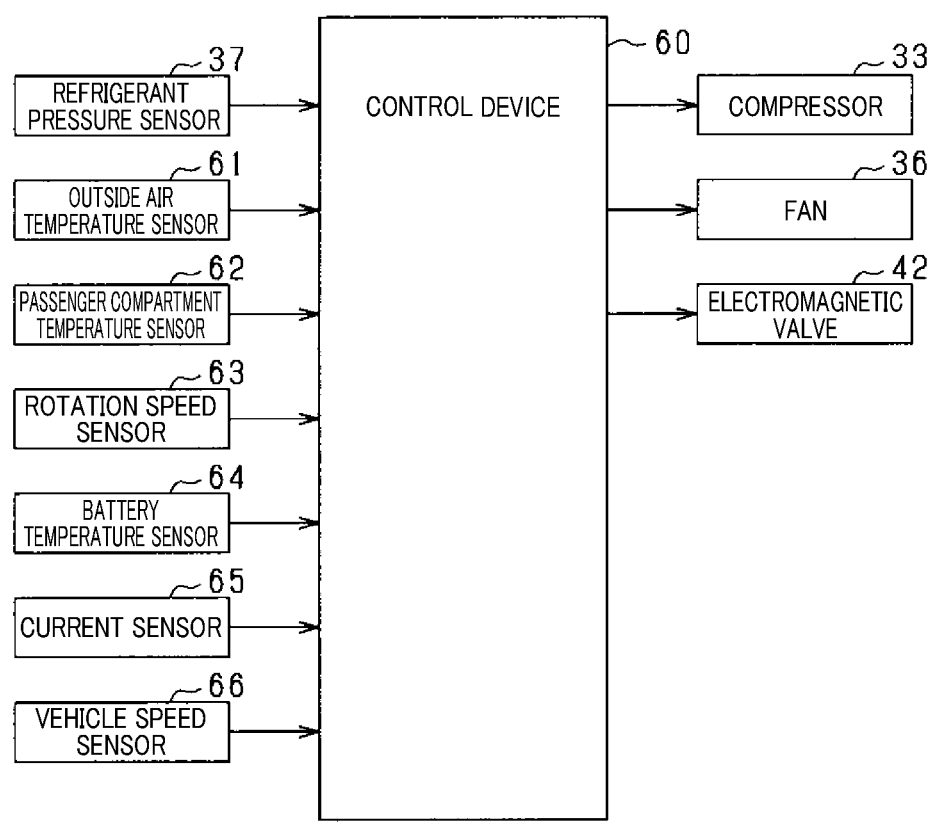
FIG. 2 is a block diagram illustrating an electrical configuration regarding cooling of a battery.

FIG. 2 is a block diagram illustrating an electrical configuration regarding cooling of a battery. In FIG. 2, the control device 60 includes a microcomputer including a CPU and various kinds of memories as is well known, and controls driving of the compressor 33, the heat dissipation fan 36 and the electromagnetic valve 42 based on input signals, or the like, from various kinds of sensors. The sensors include an outside temperature sensor 61 which detects an outside temperature, a passenger compartment temperature sensor 62 which detects a temperature inside a passenger compartment, a rotation speed sensor 63 which detects rotation speed of the compressor 33, a battery temperature sensor 64 which detects a battery temperature, a current sensor 65 which detects a current flowing through the compressor 33, a vehicle speed sensor 66 which detects speed (vehicle speed) of the vehicle 10, or the like, in addition to the pressure of the refrigerant sensor 37.

The control device 60 controls a drive state of the compressor 33 based on an air-conditioning request and a battery cooling request. In other words, the control device 60 controls rotation speed of the compressor 33 based on air-conditioning control parameters such as the outside temperature, the passenger compartment temperature, a set temperature and a set air volume in a case where the air-conditioning request has occurred. Further, the control device 60 controls rotation speed of the compressor 33 based on the battery temperature when the battery cooling request has occurred. In this event, the control device 60 may set target rotation speed of the compressor 33 based on the air-conditioning control parameters or the battery temperature and implements feedback control so that actual rotation speed detected by the rotation speed sensor 63 matches the target rotation speed.

Further, the control device 60 controls a heat dissipation state of the condenser 34 by driving the heat dissipation fan 36 when the compressor 33 is driven in response to the air-conditioning request and the battery cooling request. In this event, the ON/OFF state of driving of the heat dissipation fan 36 is controlled. Alternatively, in a configuration where the drive state of the heat dissipation fan 36 is adjusted in a plurality of levels (for example, three levels of low, medium and high), the drive state of the heat dissipation fan 36 is controlled to be one of the plurality of levels.

By the way, if, for example, a failure representing the heat dissipation fan 36 being stopped or output of the heat dissipation fan 36 being reduced has occurred as an abnormality in the air-conditioning refrigerant circuit 31 in the vehicle-mounted cooling system, the pressure of the refrigerant inside the refrigerant passage 32 rises as heat dissipation performance for the condenser 34 in the air-conditioning refrigerant circuit 31 degrades. In this event, driving of the compressor 33 may be stopped to prevent the pressure of the refrigerant from excessively rising in refrigerant piping which constitutes the refrigerant passage 32. However, if the driving of the compressor 33 is stopped, the battery 51 cannot be cooled using the refrigerant circulated in the refrigerant passage, which causes a risk that the battery temperature may excessively rise.

Thus, in the present embodiment, it is determined that an abnormality has occurred in the air-conditioning refrigerant circuit 31 based on occurrence of a failure representing heat dissipation fan 36 being stopped or output of heat dissipation fan 36 being reduced. Then, under a situation where the battery cooling request has occurred, and it is determined that an abnormality has occurred in the air-conditioning refrigerant circuit 31, the compressor 33 is driven in a state where driving is restricted while preventing the pressure of the refrigerant inside the refrigerant passage 32 from rising beyond a predetermined high-pressure upper limit value. The present processing is fail-safe processing upon occurrence of a failure in the heat dissipation fan 36.

As a result of driving of the compressor 33 being restricted upon occurrence of an abnormality in the air-conditioning refrigerant circuit 31, cooling of the battery 51 by the temperature adjustment unit 52 is continued in a state where the refrigerant-circulation control mode in the air-conditioning refrigerant circuit 31 is changed. In this event, rise in the pressure of the refrigerant in the refrigerant passage 32 is restricted by driving of the compressor 33 being restricted, as compared with before an abnormality occurs in the air-conditioning refrigerant circuit 31.

When driving of the compressor is restricted, a drive state of the compressor 33 or the pressure of the refrigerant inside the refrigerant passage 32 when the compressor is driven is acquired as a control parameter, and a degree of restriction on driving of the compressor 33 may be adjusted based on the control parameter after occurrence of a failure representing the heat dissipation fan 36 being stopped. In this event, change of rise or fall of the pressure of the refrigerant after a failure representing the heat dissipation fan 36 being stopped is obtained, for example, based on the pressure of the refrigerant detected by the pressure of the refrigerant sensor 37, and the degree of restriction on driving of the compressor 33, that is, a rotation speed limit value of the compressor 33 may be adjusted based on the obtained result.

Note that the pressure of the refrigerant may be estimated based on an energization current of the compressor detected by the current sensor 65.

Further, in the present embodiment, in a case where driving of the compressor 33 is restricted, air conditioning carried out by the air-conditioning refrigerant circuit 31 is also restricted. Specifically, a state of the air-conditioning refrigerant circuit 31 can be switched between a state where the refrigerant flows through the first circulation path L1 including the evaporator 35 and a state where the refrigerant flows through the second circulation path L2 which does not include the evaporator 35 and which includes the bypass passage 41, by the electromagnetic valve 42. Then, as the restriction of the air conditioning, the refrigerant flows through the second circulation path L2 and flow of the refrigerant through the first circulation path L1 is restricted.

Figure 3:
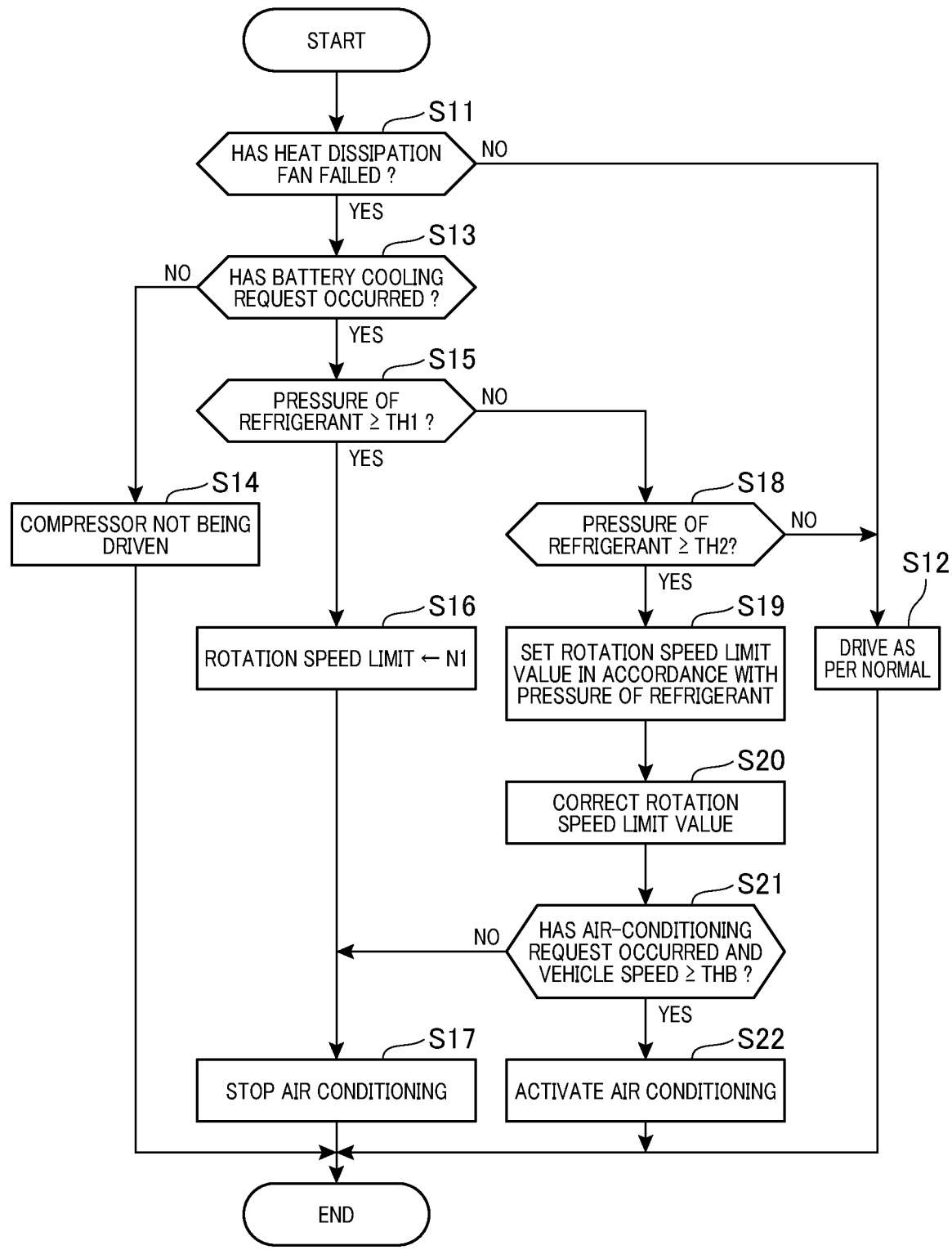
FIG. 3 is a flowchart illustrating a procedure of a battery cooling process.

FIG. 3 is a flowchart illustrating processing procedure of cooling of the battery, and the present processing is repeatedly performed with a predetermined period by the control device 60.

In FIG. 3, it is determined in step S11 whether a failure representing stopping or output reducing of the heat dissipation fan 36 has occurred as an abnormality in the air-conditioning refrigerant circuit 31. In this failure determination, for example, in a case where the heat dissipation fan 36 is not energized although a drive command has occurred to the heat dissipation fan 36, it is determined to be a stopping failure. Further, in a configuration where driving of the heat dissipation fan 36 is controlled in a plurality of levels, in a case where the heat dissipation fan 36 is driven at low speed although a command of high-speed driving has occurred, it is determined to be an output-reducing failure. Note that step S11 corresponds to an "abnormality determination unit".

In a case where a failure does not occur at the heat dissipation fan 36, a negative result is obtained in step S11, and the process proceeds to step S12, where the compressor 33 is driven as per normal. In this event, the control device 60 controls rotation speed of the compressor 33 based on the air-conditioning request and the battery cooling request.

Further, in a case where a failure has occurred in the heat dissipation fan 36, a positive result is obtained in step S11, and the process proceeds to step S13. In step S13, it is determined whether the battery cooling request has occurred. In step S13, for example, when the battery temperature is greater than or equal to a predetermined temperature, it is determined that the battery cooling request has occurred. The predetermined temperature is a temperature determined based on a temperature at which output of the battery 51 is restricted, and, for example, 40° C. When no battery cooling request has occurred, the process proceeds to step S14, where the compressor 33 becomes a non-drive state. In this event, in a case where air conditioning in response to the air-conditioning request is implemented at a time point of occurrence of a failure in the heat dissipation fan 36, air conditioning is stopped in association with stop of driving of the compressor 33.

Further, when the battery cooling request has occurred, the process proceeds to step S15, where it is determined whether the pressure of the refrigerant is greater than or equal to a first threshold TH1. The first threshold TH1 is, for example, a high-pressure upper limit value within a range in which the refrigerant piping is prevented from being damaged due to a high pressure. Alternatively, in a case where a safety valve is provided on the refrigerant piping, the first threshold TH1 is determined based on a valve opening pressure of the safety valve and is slightly lower than the valve opening pressure. Further, in a case where the pressure of the refrigerant is greater than or equal to the first threshold TH1, the process proceeds to step S16, where the rotation speed of the compressor is limited to a rotation speed limit value N1. In this event, the control device 60 implements rotation speed feedback control while setting the rotation speed limit value N1 as the target rotation speed of the compressor 33. The rotation speed limit value N1 may be a rotation speed lower than the rotation speed of the compressor in a case where only the battery cooling request out of the air-conditioning request and the battery cooling request has occurred.

Thereafter, in step S17, air conditioning is stopped in a case where the air-conditioning request has occurred. Specifically, the state of the air-conditioning refrigerant circuit 31 is put into a state where the refrigerant flows through the second circulation path L2 and flow of the refrigerant through the first circulation path L1 is stopped. As a result of this, air conditioning is restricted. For example, the state of the air-conditioning refrigerant circuit 31 may be put into a state where the refrigerant flows also through the first circulation path L1 in addition to the second circulation path L2 while restricting a flow rate of the refrigerant by control of the electromagnetic valve 42. Note that in step S17, a degree of air conditioning may be restricted (reduced) while air conditioning is continued instead of stopping air conditioning. Step S17 corresponds to an "air-conditioning restriction unit".

Figure 4:
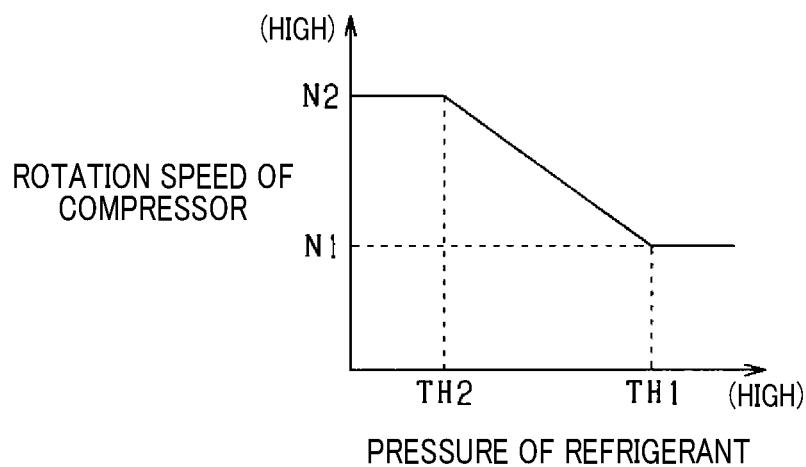
FIG. 4 is a view illustrating a relationship between a pressure of the refrigerant and rotation speed of a compressor.

Further, in a case where the pressure of the refrigerant is less than the first threshold TH1, the process proceeds to step S18, where it is determined whether the pressure of the refrigerant is greater than or equal to a second threshold TH2. The second threshold TH2 is a pressure threshold lower than the first threshold TH1. Then, in a case where the pressure of the refrigerant is greater than or equal to the second threshold TH2, the process proceeds to step S19, where a rotation speed limit value of the compressor 33 is set based on the pressure of the refrigerant. In this event, the rotation speed limit value of the compressor 33 may be set, for example, using relationship in FIG. 4. In FIG. 4, a relationship between the pressure of the refrigerant and the rotation speed of the compressor is defined, and the rotation speed of the compressor is set at the rotation speed limit value N1 in a range where the pressure of the refrigerant is greater than or equal to the first threshold TH1, and the rotation speed limit value is variably set within a range between N1 to N2 in a range where the pressure of the refrigerant is greater than or equal to the second threshold TH2 and less than the first threshold TH1. In this range between N1 and N2, the rotation speed limit value is set so that the rotation speed limit value becomes lower as the pressure of the refrigerant is higher. Concerning a degree of limitation of the rotation speed of the compressor, the rotation speed of the compressor is controlled so that the rotation speed is more limited as the pressure of the refrigerant is higher.

In step S16 and step S19, the rotation speed of the compressor is limited to lower rotation speed than at a normal time before an abnormality occurs in the air-conditioning refrigerant circuit 31, by this means, rise in the pressure of the refrigerant in the refrigerant passage 32 is restricted. In other words, by this means, the refrigerant-circulation control mode in the air-conditioning refrigerant circuit 31 is changed upon occurrence of an abnormality in the air-conditioning refrigerant circuit 31.

Figure 5A:
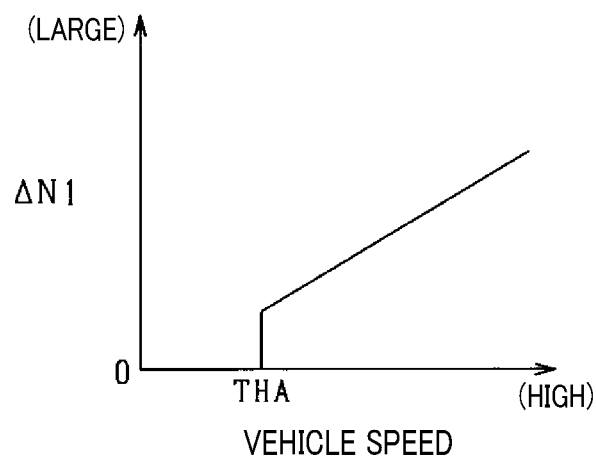
FIG. 5A is a view illustrating a relationship between vehicle speed and a rotation speed correction value $\Delta N1$.

Thereafter, in step S20, the rotation speed limit value of the compressor 33 is corrected based on vehicle speed. For example, the rotation speed limit value of the compressor 33 may be corrected, for example, using relationship in FIG. 5A. In FIG. 5A, relationship between the vehicle speed and a rotation speed correction value ΔN1 is defined, and the rotation speed correction value ΔN1 is set as a positive value in a range where the vehicle speed is greater than or equal to speed threshold THA. Further, as illustrated, the rotation speed correction value ΔN1 may be set at a greater value as the vehicle speed is higher. Then, the rotation speed limit value is corrected to increase by the rotation speed correction value ΔN1 being added to the rotation speed limit value set in step S19. As a result of the rotation speed limit value being corrected in this manner, the rotation speed limit value is corrected so as to lower a degree of limitation on the rotation speed of the compressor in response to the vehicle speed being higher than the speed threshold THA.

In step S21, it is determined whether the air-conditioning request is currently present, and the vehicle speed is greater than or equal to the speed threshold THB. The speed threshold THB is a speed value higher than the speed threshold THA. Then, in a case where a positive result is obtained in step S21, the process proceeds to step S22, and air conditioning is activated.

Figure 5B:
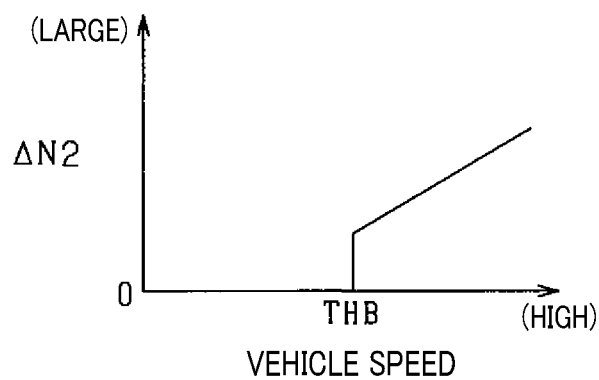
FIG. 5B is a view illustrating a relationship between the vehicle speed and a rotation speed correction value $\Delta N2$.

Specifically, air conditioning is activated by putting the state of the air-conditioning refrigerant circuit 31 into a state where the refrigerant flows through the first circulation path L1 in addition to the second circulation path L2. As a result of this, restriction on air conditioning is lifted. In control of the rotation speed of the compressor 33, the rotation speed limit value of the compressor 33 is corrected. For example, the rotation speed limit value of the compressor 33 may be corrected using the relationship in FIG. 5B. In FIG. 5B, the relationship between the vehicle speed and a rotation speed correction value ΔN2 is defined, and the rotation speed correction value ΔN2 is set as a positive value in a range where the vehicle speed is greater than or equal to the speed threshold THB. Further, as illustrated, the rotation speed correction value ΔN2 may be set to a higher value as the vehicle speed is higher. Then, the rotation speed limit value is corrected to increase by the rotation speed correction value ΔN2 being added to the rotation speed limit value set in step S19 or the rotation speed limit value corrected in step S20. As a result of the rotation speed limit value being corrected in this manner, the degree of limitation of the rotation speed of the compressor is corrected to be smaller in response to the vehicle speed being higher than the speed threshold THB.

In the relationship between FIG. 5A and FIG. 5B, the speed thresholds THA and THB have a relationship of THA<THB. Thus, when the vehicle speed rises, the degree of restriction on driving of the compressor 33 is first lowered, and thereafter, the degree of restriction on air conditioning is lowered.

Note that in step S22, a process of lowering a degree of restriction on air conditioning may be performed in place of a process of lifting restriction on air conditioning. As the process of lowering the degree of restriction on air conditioning, for example, the amount of the refrigerant which flows through the first circulation path L1 may be increased by control of the electromagnetic valve 42.

Further, in a case where a negative result is obtained in step S21, the process proceeds to step S17, where a process of stopping air conditioning or a process of restricting air conditioning is performed. Note that step S15 to step S22 corresponds to a "control mode change unit".

Figure 6:
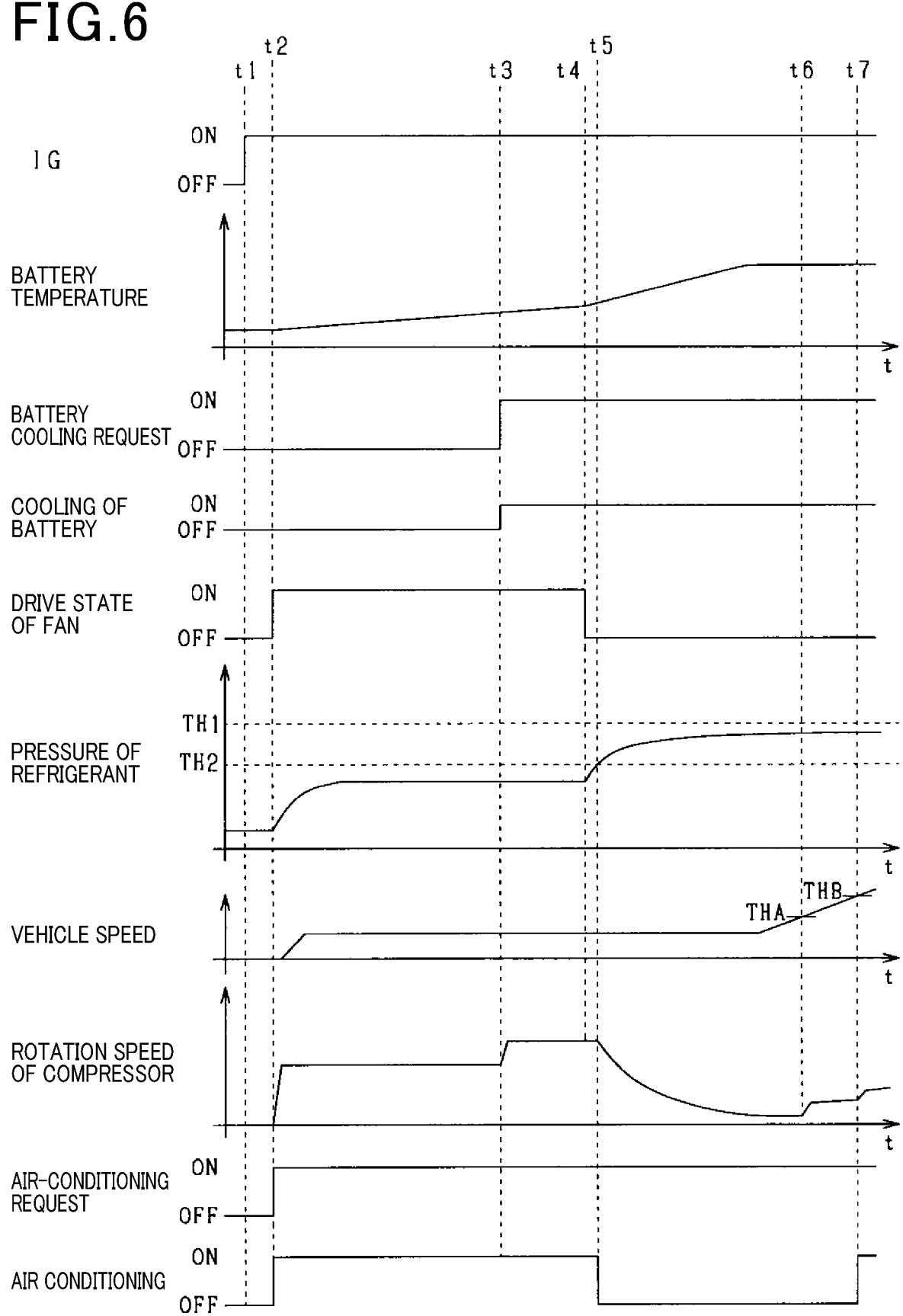
FIG. 6 is a timing chart for explaining a battery cooling process in more detail.

FIG. 6 is a timing chart for explaining a battery cooling process in more detail.

In FIG. 6, an ignition switch of the vehicle 10 is turned on at a timing t1, and after an initial process for enabling the vehicle to travel is performed, air conditioning is started at a timing t2 in response to an air-conditioning request. At and after the timing t2, the rotation speed of the compressor is feed-back controlled to the target rotation speed determined in accordance with content of each air-conditioning request. As a result, the pressure of the refrigerant gradually rises. Further, driving of the heat dissipation fan 36 is started. Note that FIG. 6 illustrates a drive state of the heat dissipation fan 36 as an ON/OFF state.

Thereafter, the battery temperature gradually rises as the vehicle travels. Then, at a timing t3, the battery cooling request occurs as a result of the battery temperature exceeding a predetermined value, and cooling of the battery is started in response to the battery cooling request. At and after the timing t3, the rotation speed of the compressor is controlled in response to each air-conditioning request and each battery cooling request. As a result, the rotation speed of the compressor and the pressure of the refrigerant rise in response to the battery cooling request.

Thereafter, at a timing t4, an abnormality has occurred in the air-conditioning refrigerant circuit 31 in association with a stopping failure (OFF failure) in the heat dissipation fan 36, and the pressure of the refrigerant inside the refrigerant passage 32 rises as heat dissipation performance for the condenser 34 in the air-conditioning refrigerant circuit 31 degrades.

At a timing t5, the pressure of the refrigerant becomes higher than the second threshold TH2, and at and after the timing t5, the rotation speed of the compressor 33 is controlled with the rotation speed limit value set based on the pressure of the refrigerant. In this event, lower rotation speed is set as the rotation speed limit value of the compressor 33 as the pressure of the refrigerant becomes higher. Further, at the timing t5, air conditioning is stopped regardless of the occurrence of the air-conditioning request. At and after the timing t5, while the battery temperature gradually rises, excessive rise is prevented. The pressure of the refrigerant is maintained at a pressure lower than the first threshold TH1 which is a high-pressure upper limit value. While not illustrated, in a case where the pressure of the refrigerant reaches the first threshold TH1, the rotation speed of the compressor is reduced to the rotation speed limit value N1.

Note that while the battery temperature may rise by an energization current when the compressor 33 is driven, it is assumed in the present embodiment that cooling capability by a cooling system is higher than the temperature rise.

Thereafter, at a timing t6, the rotation speed limit value of the compressor 33 is corrected to increase in association with rise of the vehicle speed to the speed threshold THA. In this event, heat dissipation of the condenser 34 is enhanced by traveling wind of the vehicle 10, and thus, the rotation speed of the compressor can be increased correspondingly without the pressure of the refrigerant rising.

Thereafter, at a timing t7, air conditioning is started in association with further rise of the vehicle speed to the speed threshold THB. In this event, heat dissipation of the condenser 34 necessary for activating air conditioning becomes possible as a result of the vehicle 10 traveling at high speed, so that start of air conditioning is allowed.

According to the present embodiment described in detail above, the following excellent effects can be obtained.

Under a situation where the battery cooling request occurs, and it is determined that an abnormality has occurred in the air-conditioning refrigerant circuit 31 in association with a failure of the heat dissipation fan 36, the refrigerant-circulation control mode in the air-conditioning refrigerant circuit 31 is changed while cooling of the battery 51 by the temperature adjustment unit 52 is continued. In this case, rise in the pressure of the refrigerant in the refrigerant passage 32 is restricted as compared with before an abnormality occurs in the air-conditioning refrigerant circuit 31. More specifically, the compressor 33 is driven in a state where driving is restricted to prevent the pressure of the refrigerant inside the refrigerant passage 32 from rising beyond a predetermined high-pressure upper limit value. By this means, even if an abnormality has occurred in the air-conditioning refrigerant circuit 31, it is possible to circulate the refrigerant by a mode corresponding to occurrence of the abnormality. As a result, it is possible to appropriately cool the battery upon occurrence of an abnormality in the air-conditioning refrigerant circuit 31 while achieving a simpler configuration. Further, it is possible to continuously cool the battery 51 while protecting the piping which forms the refrigerant passage 32, or the like, upon a failure of the heat dissipation fan 36.

In a case where driving of the compressor 33 is restricted in association with occurrence of a failure of the heat dissipation fan 36, air conditioning carried out by the air-conditioning refrigerant circuit 31 is restricted. In this case, the battery cooling request is prioritized, for example, under a situation where both the air-conditioning request and the battery cooling request have occurred. In other words, the refrigerant is circulated in the refrigerant passage 32 so as to cool the battery 51. By this means, it is possible to suitably prevent degradation of the battery 51 in association with excessive rise of the battery temperature.

In a case where restriction on driving of the compressor 33 and restriction on air conditioning are performed in association with occurrence of a failure of the heat dissipation fan 36, as the restriction on air conditioning, the refrigerant flows through the second circulation path L2 including the bypass passage 41 (temperature adjustment unit 52), and flow of the refrigerant through the first circulation path L1 including the evaporator 35 is restricted. In this case, it is possible to suitably cool the battery while restricting air conditioning by preventing the refrigerant from being evaporated by the evaporator 35.

In a case where driving of the compressor 33 is restricted in association with occurrence of a failure of the heat dissipation fan 36, restriction on air conditioning is lifted or a degree of restriction on air conditioning is lowered in response to the vehicle speed being higher than the predetermined speed threshold THB. In a case where the vehicle speed is higher, by taking into account that heat dissipation of the condenser 34 is performed due to traveling wind, it is possible to implement air conditioning in addition to cooling of the battery even under a situation where driving of the compressor 33 is restricted. In this case, it is possible to switch, for example, from a state where air conditioning is stopped as a restriction on air conditioning to a state where air conditioning is implemented.

A degree of restriction on driving of the compressor 33 is lowered in response to the vehicle speed being higher than the speed threshold THA under a situation where driving of the compressor 33 is restricted. In a case where the vehicle speed is higher, by taking into account that heat dissipation of the condenser 34 is performed due to traveling wind, it is possible to increase a degree of cooling of the battery by lowering the degree of restriction on driving of the compressor 33.

A degree of restriction on driving of the compressor 33 is lowered in response to the vehicle speed being higher than the speed threshold THA (a first speed threshold), and a degree of restriction on air conditioning is lowered in response to the vehicle speed being higher than the speed threshold THB (a second speed threshold) which is higher than the speed threshold THA, under a situation where driving of the compressor 33 is restricted. By this means, it is possible to lower the degree of restriction on driving of the compressor 33 and lower the degree of restriction on air conditioning in accordance with the vehicle speed. In this case, when the vehicle speed increases, the degree of restriction on driving of the compressor 33 is first lowered, and thereafter, the degree of restriction on air conditioning is lowered. It is therefore possible to appropriately implement air conditioning while prioritizing cooling of the battery upon a failure of the heat dissipation fan 36.

In a case where a failure of the heat dissipation fan 36 has occurred, a cooling state of the refrigerant in the condenser 34 is different from that during normal functioning of the heat dissipation fan 36, and the drive state of the compressor 33 or the pressure of the refrigerant in the driving of the compressor 33 changes. In this case, by obtaining change of the pressure of the refrigerant after a stopping failure of the heat dissipation fan 36 has occurred and adjusting a degree of restriction on driving of the compressor 33 based on the control parameter indicating the drive state of the compressor 33 or the pressure of the refrigerant in the driving of the compressor 33, it is possible to cool the battery as appropriate in accordance with the drive state of the compressor 33 and further in accordance with the pressure of the refrigerant.

Note that a component which determines whether a heat dissipation abnormality (blockage abnormality) has occurred due to blockage of the condenser 34 may be used as an abnormality determination unit which determines whether an abnormality has occurred in the air-conditioning refrigerant circuit 31. This abnormality is, for example, a blockage abnormality in a condenser fin. For example, in step S11 in FIG. 3, it is determined whether a blockage abnormality has occurred in the condenser 34 based on the pressure of the refrigerant on an upstream side of the condenser 34. It is also possible to perform both determination as to whether a failure representing the heat dissipation fan 36 being stopped or output of the heat dissipation fan 36 being reduced has occurred and determination as to whether a blockage abnormality has occurred at the condenser 34 in step S11 in FIG. 3. In this case, it is only necessary to determine whether an abnormality has occurred in heat dissipation of the condenser 34 in a broad sense.

Another embodiment obtained by changing part of the configuration of the above-described first embodiment will be described below. Note that in the following description, the same reference numerals will be assigned to components which are the same as those in the above-described first embodiment, and description thereof will be omitted.

Second Embodiment

In the present embodiment, in a case where it is determined that a failure has occurred in the heat dissipation fan 36 as an abnormality in the air-conditioning refrigerant circuit 31 under a situation where no battery cooling request has occurred, it is predicted whether a battery cooling request will occur in the future based on the predicted future traveling of the vehicle from the present time, and in a case where it is predicted that a battery cooling request will occur, driving of the compressor 33 is restricted.

Figure 7:
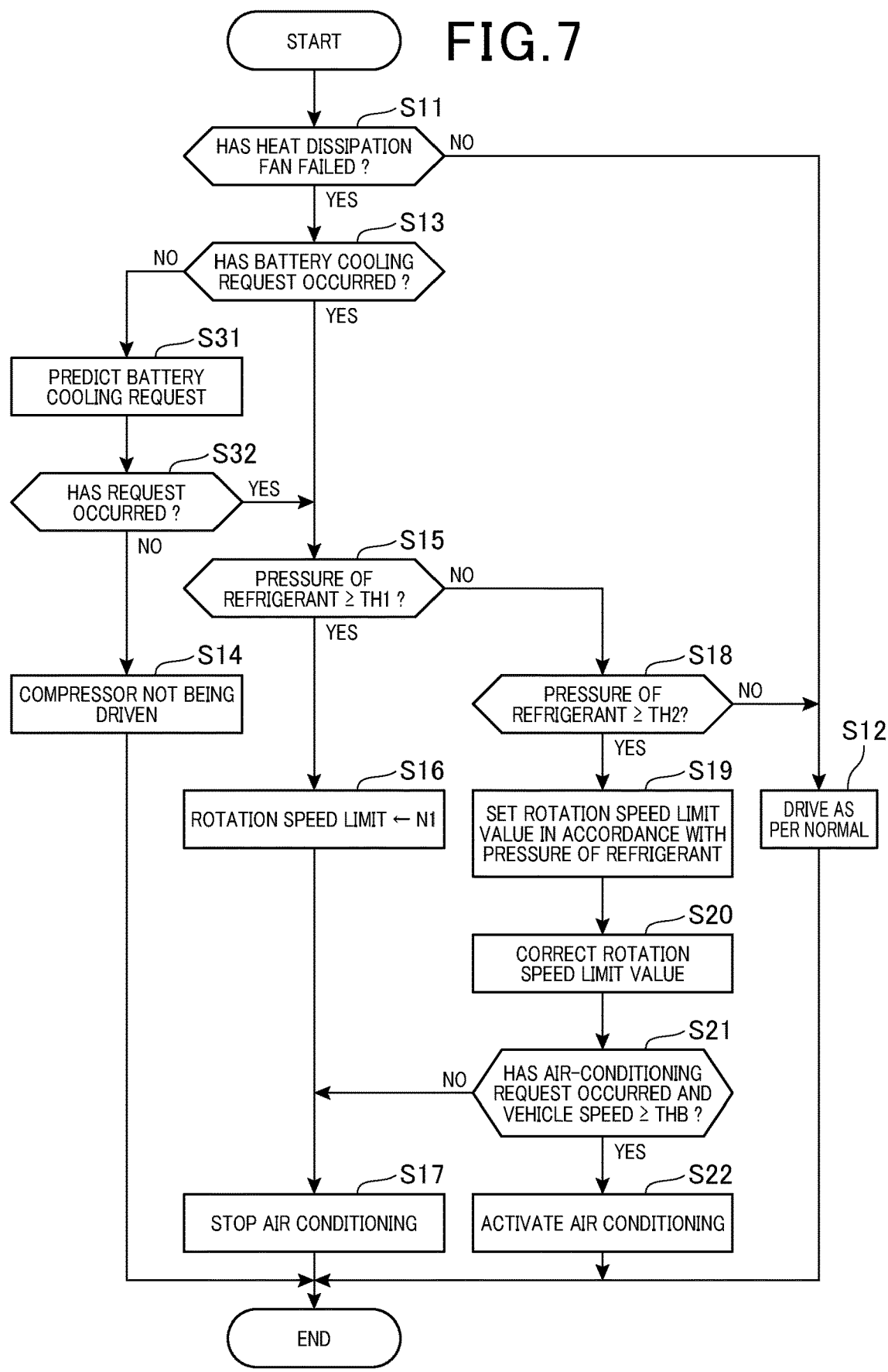
FIG. 7 is a flowchart illustrating procedure of a battery cooling process in a second embodiment.

FIG. 7 is a flowchart illustrating procedure of a battery cooling process in the present embodiment, and the present process is implemented in place of the process in FIG. 3. Note that in FIG. 7, the same step numbers are assigned to process which is the same as the process in FIG. 3.

The process in FIG. 7 is different from the process in FIG. 3 in that in a case where a failure has occurred in the heat dissipation fan 36, and no battery cooling request has occurred (step S11: Yes and step S13: No), the process proceeds to step S31. In step S31, it is predicted whether the battery cooling request occurs based on the predicted future traveling of the vehicle from the present time. In this event, the control device 60 predicts whether the battery cooling request occurs based on a travel destination of the vehicle 10 registered in advance at a navigation apparatus, or the like. More specifically, it is predicted whether the battery cooling request occurs in the future based on a travel distance to the travel destination, required time, road inclination on a travel path, or the like. For example, it is predicted that the battery cooling request is more likely to occur as the travel distance to the travel destination is longer, as the required time is longer, and the travel path includes more acclivities as the road inclination. In addition, it is also possible to take into account an outdoor air temperature and a load weight of the vehicle 10.

Thereafter, in step S32, it is determined whether the prediction result in step S31 is a prediction result predicting that the battery cooling request will occur. Then, in a case where the prediction result is not a prediction result predicting that the battery cooling request will occur, the process proceeds to step S14, where the compressor 33 is put into a non-drive state.

Further, in a case where the prediction result is a prediction result predicting that the battery cooling request will occur, the process proceeds to step S15, and as described above, the process of limiting the rotation speed of the compressor is performed based on the pressure of the refrigerant. The process in step S15 and subsequent processing are as described above.

However, in a case where it is predicted in step S31 that the battery cooling request will occur, a degree of restriction on driving of the compressor 33 in a drive state may be made larger than in a case where the battery cooling request has already occurred at the present time. Specifically, the rotation speed limit value set in step S16 or step S19 may be set to a smaller value in a case where driving of the compressor 33 is restricted as a result of a positive result being obtained in step S13 than in a case where the driving of the compressor 33 is restricted as a result of a positive result being obtained in step S32.

According to the second embodiment described above, even if no battery cooling request has occurred upon a failure of the heat dissipation fan 36, it is possible to cool the battery in advance, based on whether it is necessary to cool the battery from the present time. In this case, even if an amount of heat generation of the battery rises sharply in association with exponential increase, or the like, of electric load under a situation where a failure has occurred in the heat dissipation fan 36, it is possible to prevent rise of the battery temperature. In other words, even in a case where the temperature rises due to insufficient cooling, it is possible to prevent the battery temperature from excessively rising during traveling. By this means, it is possible to protect the battery 51.

Whether the battery cooling request will occur is predicted based on the travel destination of the vehicle 10, so that it is possible to suitably cope with rise of the battery temperature in association with abrupt change of traveling load.

A degree of restriction on driving of the compressor in a drive state is made larger in a case where driving of the compressor 33 is restricted due to a prediction that a battery cooling request will occur than in a case where driving of the compressor is restricted because a battery cooling request has actually occurred. In this case, it is possible to appropriately cool the battery while preventing the battery from being excessively cooled or preventing air conditioning from being excessively restricted.

Other Embodiments

The above-described embodiments may be changed, for example, as follows.

While the above-described embodiments employ a configuration where driving of the compressor 33 is restricted upon occurrence of an abnormality in the air-conditioning refrigerant circuit 31, this configuration may be changed. For example, it is also possible to employ a configuration where the control device 60 can control the expansion valve 38 and rise in the pressure of the refrigerant in the refrigerant passage 32 is controlled by control of the expansion valve 38. In this case, an amount of the refrigerant which passes through the expansion valve 38 is adjusted, and the pressure of the refrigerant is restricted accordingly.

As a restriction on air conditioning, the amount of the refrigerant which passes through the expansion valve 38 can be reduced or the amount of the refrigerant which passes through the expansion valve 38 can be reduced to zero. In this case, as a restriction on air conditioning, the circulation path may be switched between the circulation path L1 and the circulation path L2 and the amount of the refrigerant which passes through the expansion valve 38 may be adjusted.

As a configuration where rise in the pressure of the refrigerant in the refrigerant passage 32 is restricted more strictly than at a normal time before an abnormality occurs, upon occurrence of an abnormality in the air-conditioning refrigerant circuit 31, an upper limit value of the pressure of the refrigerant or an upper limit value of rotation speed of the compressor corresponding to the upper limit value of the pressure of the refrigerant is made different between the normal time and upon occurrence of an abnormality, and the upper limit value of the pressure of the refrigerant or the upper limit value of the rotation speed of the compressor upon occurrence of an abnormality may be made smaller than the upper limit value at the normal time. For example, the upper limit value of the rotation speed of the compressor upon occurrence of an abnormality is made smaller than the upper limit value of the rotation speed of the compressor at the normal time. In such a configuration, if the rotation speed of the compressor is relatively low at a time point of occurrence of an abnormality in the air-conditioning refrigerant circuit 31, the rotation speed of the compressor does not necessarily have to be reduced immediately, and in a case where the rotation speed exceeds an upper limit value of rotation speed which is determined to have a lower value than that at normal time, the rotation speed of the compressor may be limited by the upper limit value.

Figure 8:
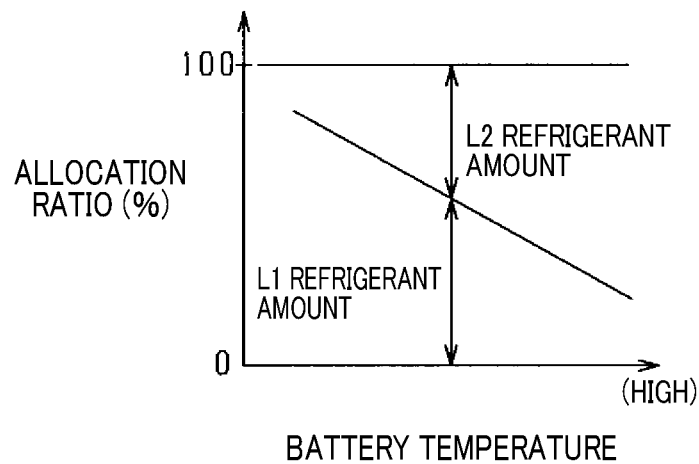
FIG. 8 is a view illustrating an allocation ratio between an amount of a refrigerant flowing through a first circulation path and an amount of a refrigerant flowing through a second circulation path.

The air conditioning may be restricted while (i) an amount of a part of the refrigerant that flows through the first circulation path L1; and (ii) an amount of a remaining part of the refrigerant that flows through the second circulation path L2, being adjusted, based on a temperature of the battery. Specifically, the control device 60 adjusts an amount of a part of the refrigerant that flows through the first circulation path L1 (L1 refrigerant amount) and an amount of a remaining part of the refrigerant that flows through the second circulation path L2 (L2 refrigerant amount) based on a relationship in FIG. 8 when a failure has occurred in the heat dissipation fan 36. In FIG. 8, an allocation ratio is adjusted so that the L2 refrigerant amount becomes less than or equal to the L1 refrigerant amount as the battery temperature is higher. Note that the present process may be performed in, for example, step S17 in FIG. 3.

According to the above-described configuration, it is possible to suitably implement air conditioning as well as cooling of the battery while taking into account the degree required for cooling the battery.

Figure 9:
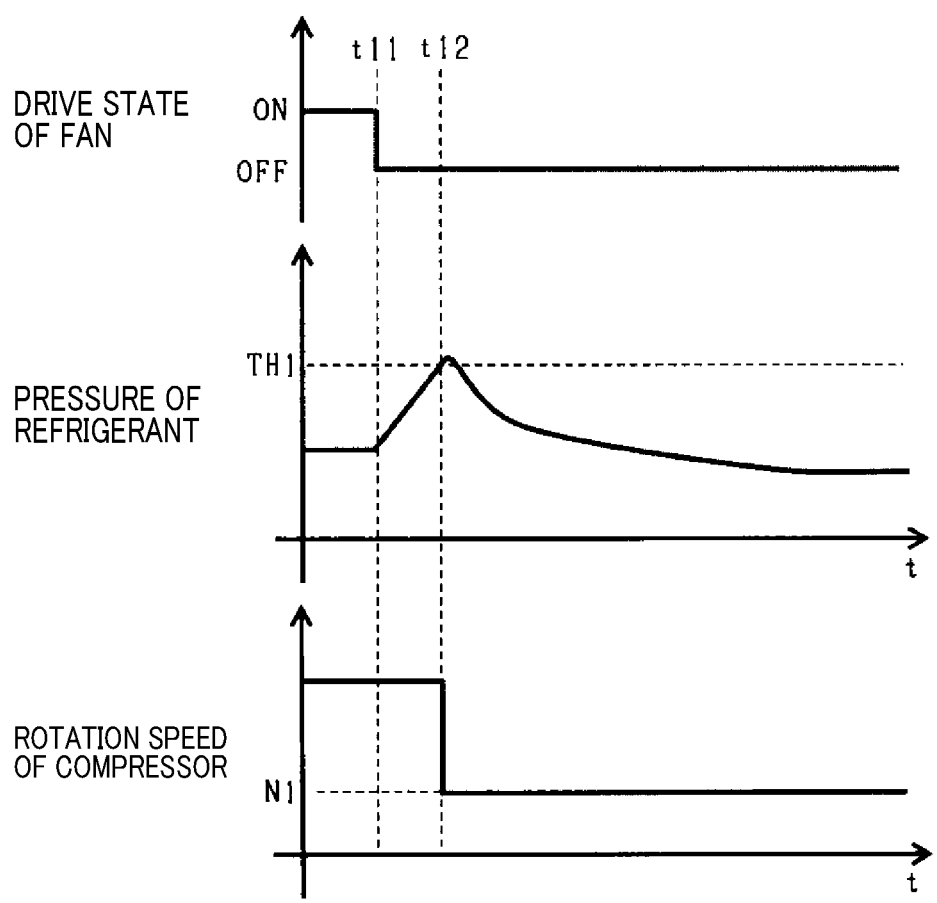
FIG. 9 is a timing chart for explaining a battery cooling process in detail in another example.
Figure 10:
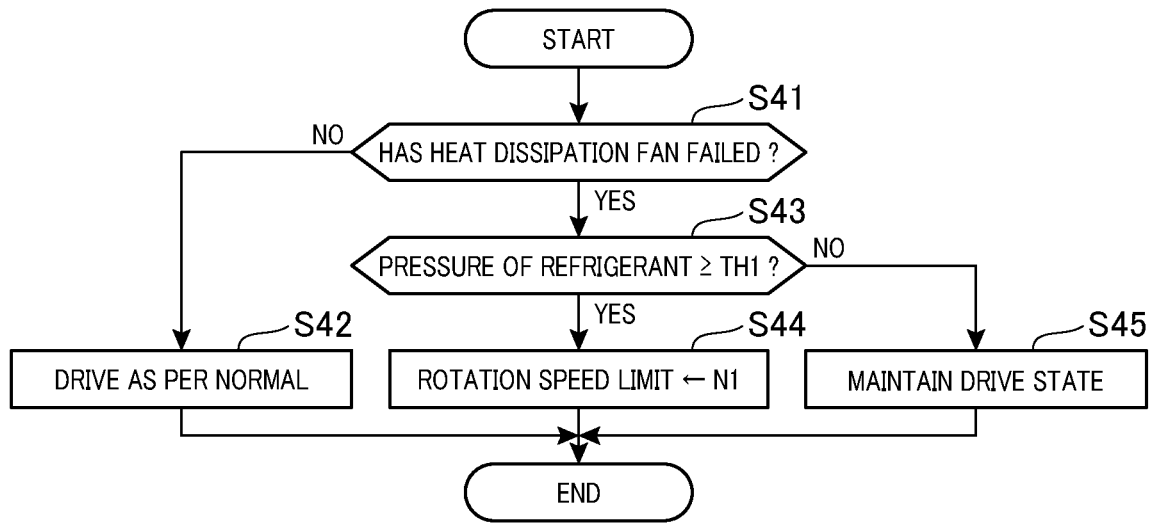
FIG. 10 is a flowchart illustrating a procedure of a battery cooling process in another example.
Figure 11:
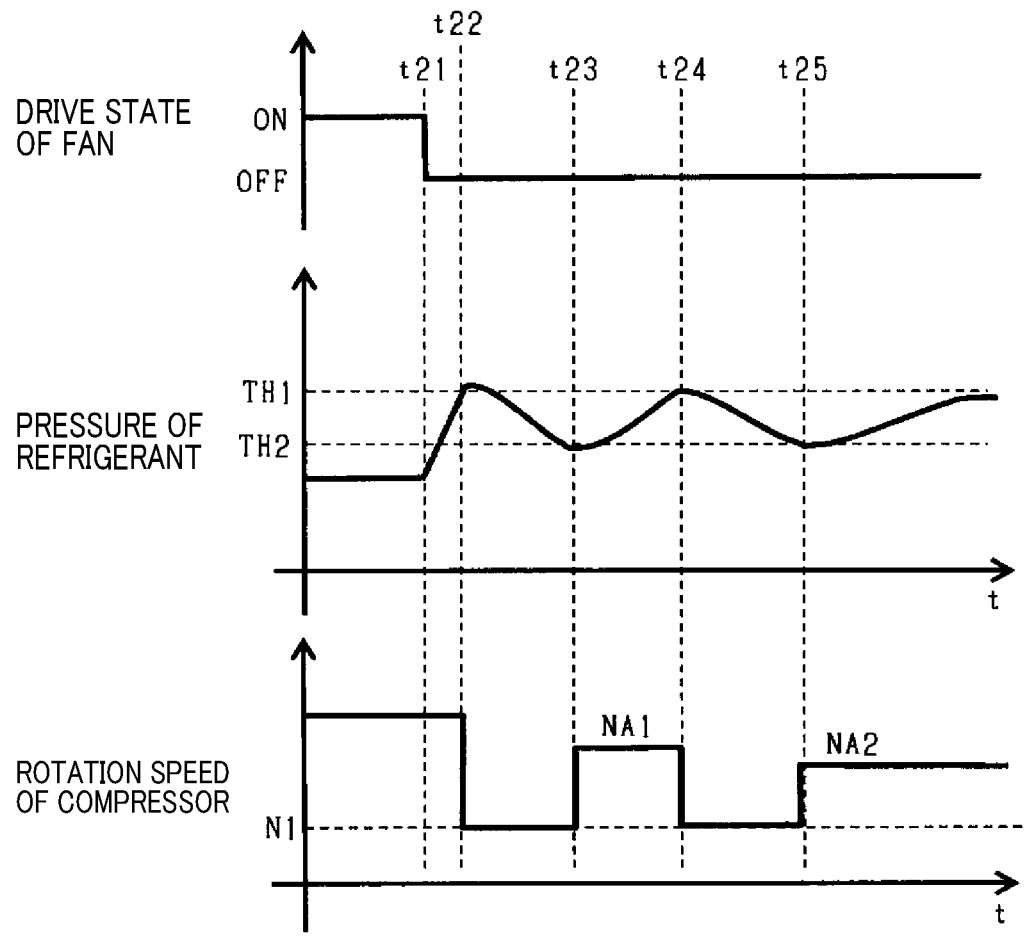
FIG. 11 is a timing chart for explaining a battery cooling process in detail in another example.
Figure 12:
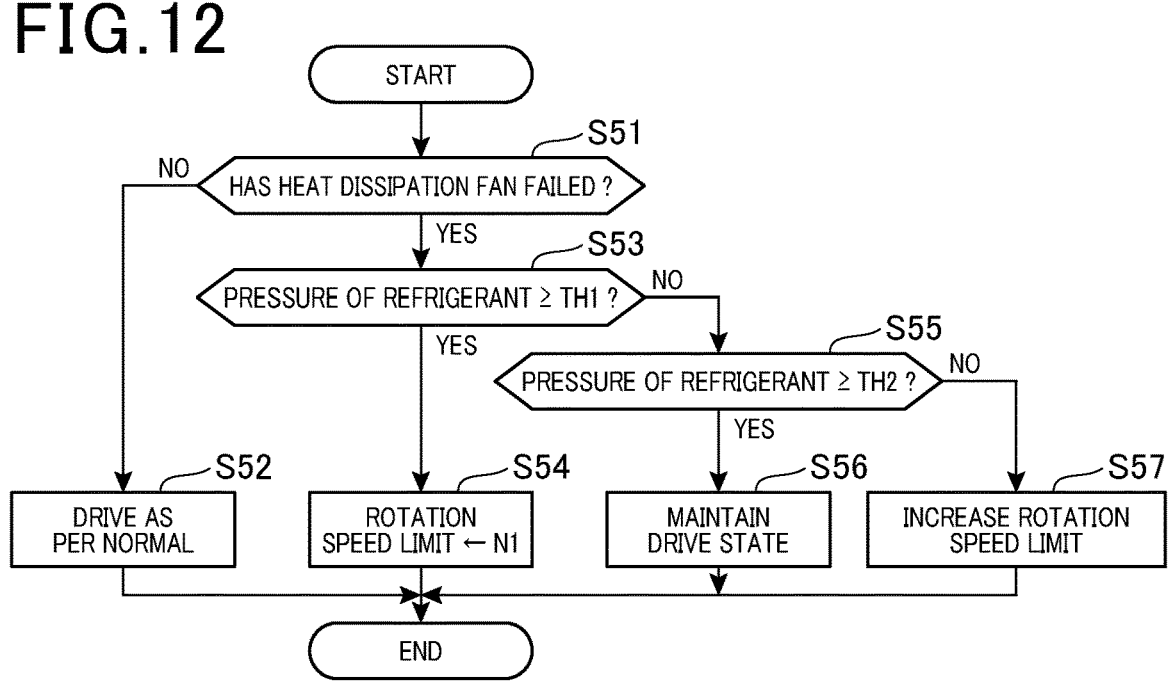
FIG. 12 is a flowchart illustrating procedure of a battery cooling process in another example.
Figure 13:
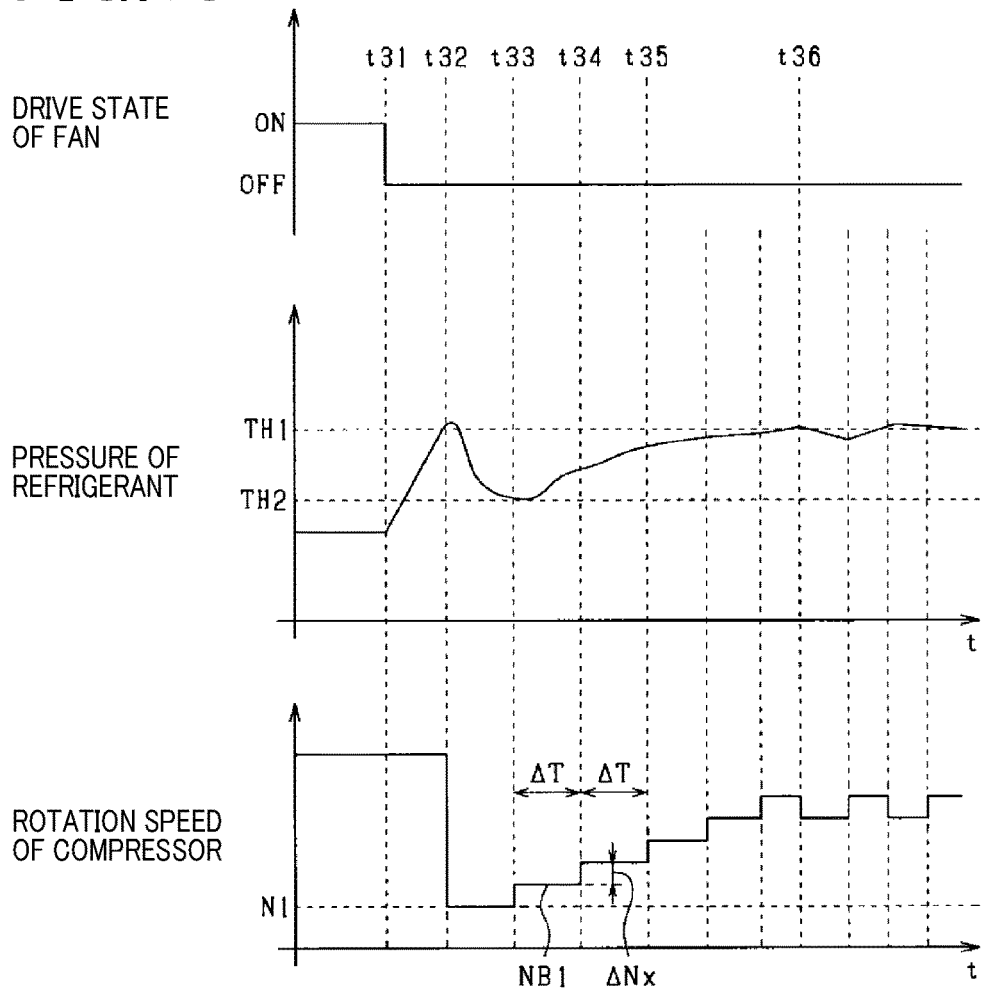
FIG. 13 is a timing chart for explaining a battery cooling process in detail in another example.
Figure 14:
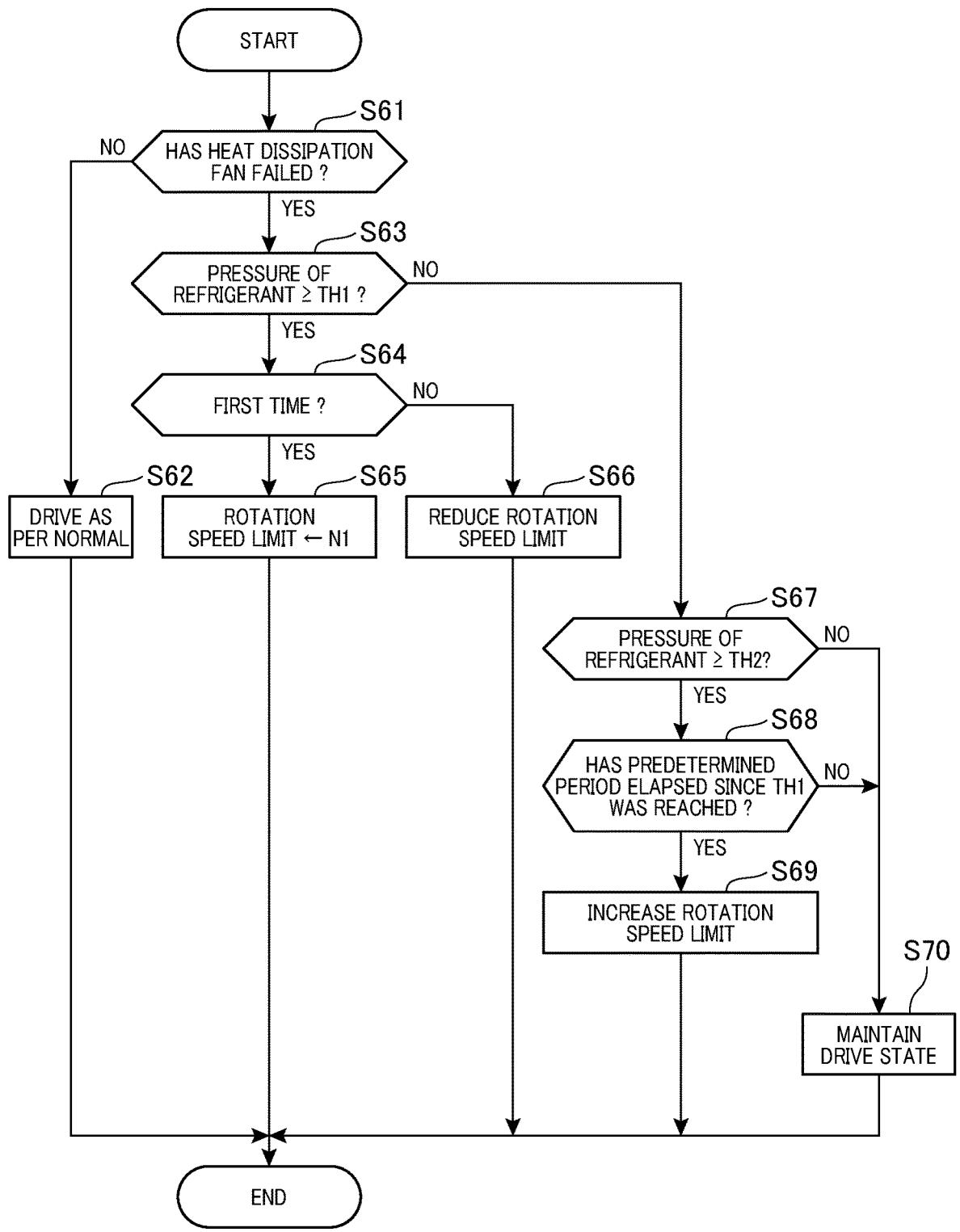
FIG. 14 is a flowchart illustrating a procedure of a battery cooling process in another example.

When an abnormality has occurred in the air-conditioning refrigerant circuit 31, the control mode of the refrigerant circulation in the air-conditioning refrigerant circuit 31 may be changed using the following respective methods. Note that a configuration where driving of the compressor 33 is restricted upon occurrence of a failure of the heat dissipation fan 36 will be described here. FIG. 9 illustrates a timing chart and FIG. 10 illustrates a flowchart of a first method. Further, FIG. 11 illustrates a timing chart and FIG. 12 illustrates a flowchart of a second method. FIG. 13 illustrates a timing chart and FIG. 14 illustrates a flowchart of a third method. FIG. 10, FIG. 12 and FIG. 14 are respectively flowcharts illustrating a procedure of a battery cooling process, and one of them is repeatedly performed by the control device 60 with a predetermined period. Note that these flowcharts assume that the battery cooling request has occurred while a process thereof is not illustrated.

First, the first method will be described. As illustrated in FIG. 9, when a failure of the heat dissipation fan 36 occurs at a timing t11, the pressure of the refrigerant rises, and the pressure of the refrigerant rises to the first threshold TH1 at a timing t12. As a result of this, the rotation speed of the compressor is controlled to the rotation speed limit value N1 at and after the timing t12. Note that as described above, the first threshold TH1 is a high-pressure upper limit value within a range in which the refrigerant piping is prevented from being damaged due to a high pressure or a pressure threshold determined based on the valve opening pressure of the safety valve.

In the battery cooling process by the control device 60, it is determined in step S41 in FIG. 10 whether a failure representing the heat dissipation fan 36 being stopped or output of the heat dissipation fan 36 being reduced has occurred. In a case where a failure does not occur in the heat dissipation fan 36, the process proceeds to step S42, where the compressor 33 is driven as per normal.

On the other hand, in a case where a failure has occurred in the heat dissipation fan 36, the process proceeds to step S43, where it is determined whether the pressure of the refrigerant is greater than or equal to the first threshold TH1. Then, in a case where the pressure of the refrigerant is greater than or equal to the first threshold TH1, the process proceeds to step S44, where the rotation speed of the compressor is limited to the rotation speed limit value N1. On the other hand, in a case where the pressure of the refrigerant is less than the first threshold TH1, the process proceeds to step S45, where the drive state of the compressor 33 at the present time is maintained. In other words, the target rotation speed of the compressor 33 is maintained at a current state (that is, a normal drive state or a driving restricted state).

According to the above-described first method, in a case where the pressure of the refrigerant rises to the first threshold TH1 when a failure of the heat dissipation fan 36 has occurred, driving of the compressor 33 is restricted in a uniform mode thereafter.

The second method will be described next. As illustrated in FIG. 11, when a failure of the heat dissipation fan 36 occurs at a timing t21, the pressure of the refrigerant rises, and the pressure of the refrigerant rises to the first threshold TH1 at a timing t22. As a result of this, the rotation speed of the compressor is controlled to the rotation speed limit value N1, and the pressure of the refrigerant turns to decrease at the timing t22. Thereafter, if the pressure of the refrigerant is lowered to the second threshold TH2 which is lower than the first threshold TH1 at a timing t23, the rotation speed limit value of the compressor 33 is updated to NA1 which is higher than N1 (that is, rotation speed which is less limited than N1).

Thereafter, if the pressure of the refrigerant rises again and rises to the first threshold TH1 at a timing t24, the rotation speed of the compressor is controlled to the rotation speed limit value N1, and thereafter, in a case where the pressure of the refrigerant is lowered and lowered to the second threshold TH2 at a timing t25, the rotation speed limit value of the compressor 33 is updated to NA2 which is higher than N1 and lower than NA1 (that is, rotation speed which is more limited than the previous rotation speed when the pressure reaches TH2). Similar process is repeated as necessary thereafter.

In the battery cooling process by the control device 60, it is determined in step S51 in FIG. 12 whether a failure representing the heat dissipation fan 36 being stopped or output of the heat dissipation fan 36 being reduced has occurred. In a case where a failure does not occur in the heat dissipation fan 36, the process proceeds to step S52, where the compressor 33 is driven as per normal.

Further, in a case where a failure has occurred in the heat dissipation fan 36, the process proceeds to step S53, where it is determined whether the pressure of the refrigerant is greater than or equal to the first threshold TH1. Then, in a case where the pressure of the refrigerant is greater than or equal to the first threshold TH1, the process proceeds to step S54, where the rotation speed of the compressor is limited to the rotation speed limit value N1. On the other hand, in a case where the pressure of the refrigerant is less than the first threshold TH1, the process proceeds to step S55, where it is determined whether the pressure of the refrigerant is greater than or equal to the second threshold TH2. Then, in a case where the pressure of the refrigerant is greater than or equal to the second threshold TH2, the process proceeds to step S56, where the drive state of the compressor 33 at the present time is maintained.

Further, in a case where the pressure of the refrigerant is less than the second threshold TH2, the process proceeds to step S57, where the rotation speed limit value of the compressor 33 which is higher than the rotation speed limit value N1 is set so as to lower the degree of restriction on driving of the compressor 33. According to this step S57, for example, NA1 and NA2 are respectively set as rotation speed limit values at the timings t23 and t25 in FIG. 11. In this event, in a case where rise in the pressure of the refrigerant is repeated, a rotation speed limit value NAi is set in accordance with the number of times of repetition i, and a smaller value than the previous value (that is, a value which more limits the rotation speed than the previous value) is set as the rotation speed limit value NAi as the number of times of repetition i increases. According to the above-described second method, when a failure of the heat dissipation fan 36 has occurred, restriction on driving of the compressor 33 is started on the condition that the pressure of the refrigerant rises to the first threshold TH1. In this case, the rotation speed limit value of the compressor 33 is updated to a gradually smaller value (that is, a value which more limits the rotation speed) while the pressure of the refrigerant is prevented from exceeding the first threshold TH1.

However, the rotation speed limit value set in step S57 in FIG. 12 may be a rotation speed which is the same every time (that is, rotation speed which limits the rotation speed to the same degree). Alternatively, a rotation speed which is not limited may be set in step S57.

The third method will be described next. As illustrated in FIG. 13, if a failure of the heat dissipation fan 36 occurs at a timing t31, the pressure of the refrigerant rises, and the pressure of the refrigerant rises to the first threshold TH1 at a timing t32. As a result of this, the rotation speed of the compressor is controlled to the rotation speed limit value N1 and the pressure of the refrigerant starts to decrease at the timing t32. Thereafter, if the pressure of the refrigerant is lowered to the second threshold TH2 which is lower than the first threshold TH1 at a timing t33, the rotation speed limit value of the compressor 33 is updated to NB1 which is higher than N1 (that is, rotation speed which less limits the rotation speed than N1).

At and after the timing t33, change of rise in the pressure of the refrigerant is monitored at a predetermined time interval ΔT, and, for example, at timings t34 and t35, the rotation speed limit value of the compressor 33 is updated to a gradually greater value (that is, value which less limits the rotation speed). The time interval ΔT may be a fixed period or may be a period which becomes gradually shorter. Further, an updating width ΔNx which gradually increases the rotation speed limit value may be a fixed value or may be a value which becomes gradually smaller. Then, at a timing t34, the rotation speed limit value is updated to a small value in response to the pressure of the refrigerant rising to the first threshold TH1. Similar processing is repeated thereafter.

In the battery cooling process by the control device 60, it is determined in step S61 in FIG. 14 whether a failure representing the heat dissipation fan 36 being stopped or output of the heat dissipation fan 36 being reduced has occurred. In a case where a failure has not occurred in the heat dissipation fan 36, the process proceeds to step S62, where the compressor 33 is driven as per normal.

On the other hand, in a case where a failure has occurred in the heat dissipation fan 36, the process proceeds to step S63, where it is determined whether the pressure of the refrigerant is greater than or equal to the first threshold TH1. Then, in a case where the pressure of the refrigerant is greater than or equal to the first threshold TH1, the process proceeds to step S64, where it is determined whether the pressure of the refrigerant becomes greater than or equal to the first threshold TH1 for the first time since a failure of the heat dissipation fan 36 has occurred. In a case where it is the first time that the pressure of the refrigerant becomes greater than or equal to the first threshold TH1, the process proceeds to step S65, where the rotation speed of the compressor is controlled to the rotation speed limit value N1 (timing t32 in FIG. 13). On the other hand, in a case where it is not the first time that the pressure of the refrigerant becomes greater than or equal to the first threshold TH1, the rotation speed limit value is made smaller by a predetermined value to more restrict driving of the compressor 33 than the previous value (timing t36 in FIG. 13).

Further, in a case where the pressure of the refrigerant is less than the first threshold TH1, the process proceeds to step S67, where it is determined whether the pressure of the refrigerant is greater than or equal to the second threshold TH2. Then, in a case where the pressure of the refrigerant is greater than or equal to the second threshold TH2, the process proceeds to step S68, it is determined whether a predetermined time period has elapsed since the rotation speed limit value has been updated to be greater the previous time, after the pressure of the refrigerant reaches the first threshold TH1. In a case where a positive result is obtained in step S68, the process proceeds to step S69, where the rotation speed limit value is made greater by a predetermined value (timings t34 and t35 in FIG. 13).

On the other hand, in a case where a negative result is obtained in one of step S67 and step S69, the process proceeds to step S70, and the drive state of the compressor 33 at the present time is maintained.

According to the above-described third method, restriction on driving of the compressor 33 is started on condition that the pressure of the refrigerant rises to the first threshold TH1 when a failure of the heat dissipation fan 36 has occurred. In this case, the rotation speed limit value of the compressor 33 is updated to a gradually greater value from the rotation speed limit value N1 with which the rotation speed is more limited while the pressure of the refrigerant is prevented from exceeding the first threshold TH1.

A leakage of the refrigerant in the air-conditioning refrigerant circuit 31 may be determined as determination of an abnormality in the air-conditioning refrigerant circuit 31. The procedure of a battery cooling process in the present configuration will be described using FIG. 15. Here, in a case where a leakage of the refrigerant has occurred as an abnormality in the air-conditioning refrigerant circuit 31, while cooling of the battery may become insufficient due to degradation of heat exchange capability in the air-conditioning refrigerant circuit 31, shortfall of cooling of the battery is covered by restricting air conditioning as a change of the control mode upon occurrence of an abnormality.

Figure 15:
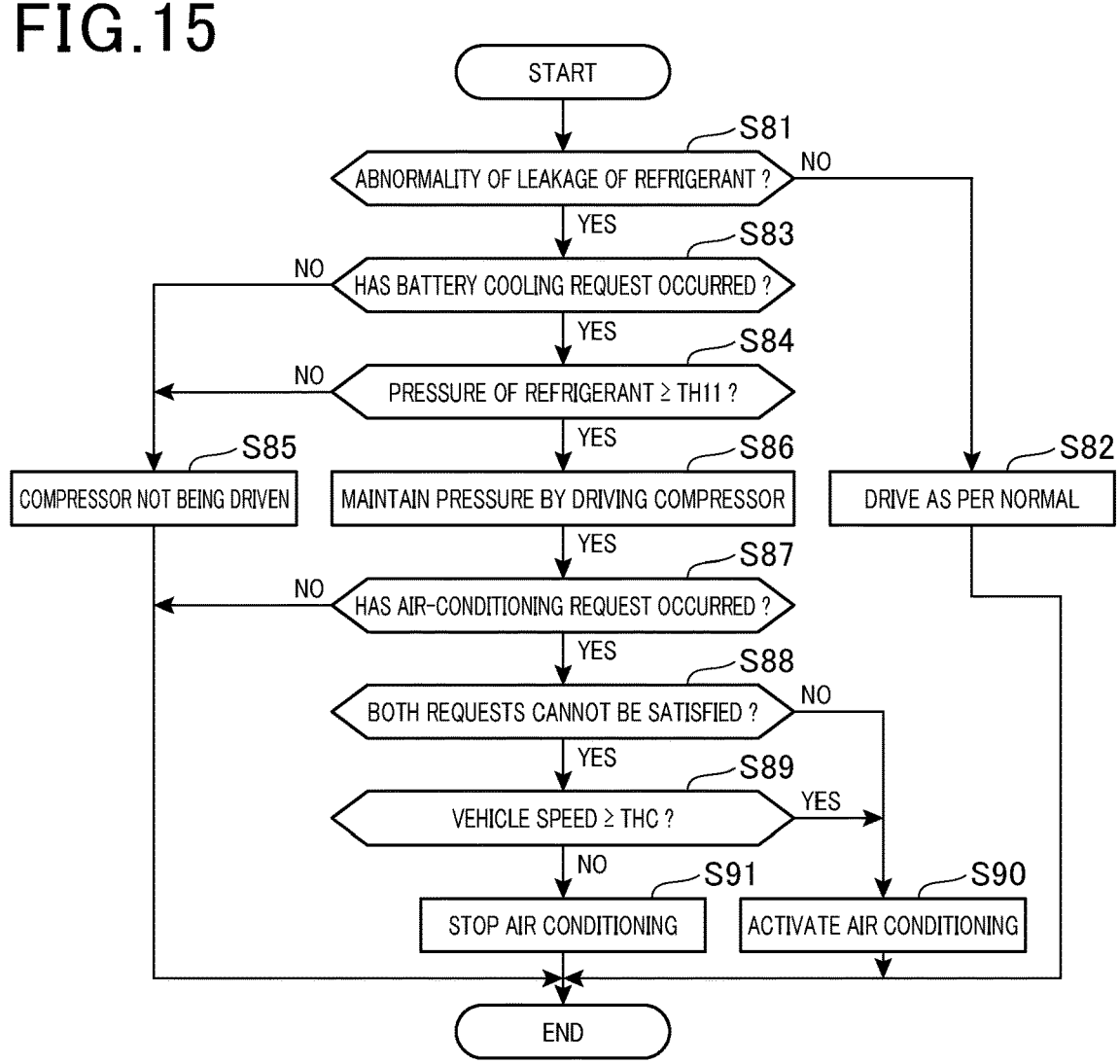
FIG. 15 is a flowchart illustrating a procedure of a battery cooling process in another example.

In FIG. 15, it is determined in step S81 whether a leakage of the refrigerant has occurred in the air-conditioning refrigerant circuit 31 as an abnormality in the air-conditioning refrigerant circuit 31. It is determined whether an abnormality due to leakage of the refrigerant has occurred, for example, based on a detection value of the pressure of the refrigerant sensor 37. It is also possible to determine whether an abnormality due to leakage of the refrigerant has occurred based on the detection value of the pressure of the refrigerant sensor 37 while taking into account the drive state of the compressor 33 such as the rotation speed of the compressor.

In a case where an abnormality due to a leakage of the refrigerant has not occurred, a negative result is obtained in step S81, and the process proceeds to step S82, where the compressor 33 is driven as per normal. In this event, the control device 60 controls the rotation speed of the compressor 33 based on the air-conditioning request and the battery cooling request.

On the other hand, in a case where an abnormality due to a leakage of the refrigerant has occurred, a positive result is obtained in step S81, and the process proceeds to step S83.

In step S83, it is determined whether the battery cooling request has occurred. When no battery cooling request has occurred, the process proceeds to step S85, where the compressor 33 is put into a non-drive state. In this event, if air conditioning in response to the air-conditioning request is implemented at a time point of occurrence of an abnormality due to a leakage of the refrigerant, air conditioning is stopped in association with stop of driving of the compressor 33.

On the other hand, when the battery cooling request has occurred, the process proceeds to step S84, where it is determined whether the pressure of the refrigerant is greater than or equal to a predetermined threshold TH11. The threshold TH11 is, for example, a pressure lower limit value at which the temperature adjustment unit 52 can cool the battery. The threshold TH11 may be determined based on a relationship between the pressure of the refrigerant and heat exchange capability of the temperature adjustment unit 52. Then, in a case where the pressure of the refrigerant is less than the threshold TH11 in step S84, the process proceeds to step S85, where the compressor 33 is put into a non-drive state. In other words, in a case where the pressure of the refrigerant is excessively lowered, the battery cannot be cooled, and thus, driving of the compressor 33 is stopped.

Further, in a case where the pressure of the refrigerant is greater than or equal to the threshold TH11, the process proceeds to step S86. In step S86, the pressure of the refrigerant is maintained at a pressure which is greater than or equal to a predetermined pressure Pa by driving of the compressor 33 so as to continue cooling of the battery even if an abnormality due to a leakage of the refrigerant has occurred. In other words, the pressure of the refrigerant is controlled at a level at which the temperature adjustment unit 52 can perform heat exchange. Note that the predetermined pressure Pa is a pressure at which at least minimal cooling of the battery can be performed, and may be, for example, a pressure of "TH11+α" with reference to the threshold TH11.

Thereafter, it is determined in step S87 whether the air-conditioning request is currently present. Then, in a case where a positive result is obtained in step S87, the process proceeds to step S88. In this event, in a case where both the air-conditioning request and the battery cooling request have occurred, a positive result is obtained in step S87. Further, in a case where a negative result is obtained in step S87, the present process is finished without further process being performed.

In step S88, it is determined whether the present situation is a situation where it is not possible to satisfy both the air-conditioning request and the battery cooling request even if output of the compressor 33 is increased. Then, in a case where a negative result is obtained in step S88, that is, in a case where it is not possible to satisfy the both requests, the process proceeds to step S90, where air conditioning is activated. In step S90, air conditioning is activated by allowing refrigerant to flow through the first circulation path L1 in addition to the second circulation path L2 in the air conditioning refrigerant circuit 31.

On the other hand, in a case where a positive result is obtained in step S88, the process proceeds to step S89. In step S89, it is determined whether the vehicle speed is greater than or equal to a speed threshold THC. Then, in a case where a positive result is obtained in step S89, the process proceeds to step S90, where air conditioning is activated.

On the other hand, in a case where a negative result is obtained in step S89, the process proceeds to step S91, where air conditioning is stopped. In this event, in the air-conditioning refrigerant circuit 31, the refrigerant flows through the second circulation path L2, and flow of the refrigerant through the first circulation path L1 is stopped. As a result of this, air conditioning is restricted.

Note that under a situation where air conditioning is stopped in step S91, that is, a positive result is obtained in step S88 and a negative result is obtained in step S89, when the vehicle speed becomes greater than or equal to the speed threshold THC, a positive result is subsequently obtained in step S89, and air conditioning is activated in step S90 (restriction on air conditioning is lifted). In this event, it is also possible to lower the degree of restriction on air conditioning in place of lifting restriction on air conditioning in step S90.

Effects in the present embodiment will be described below.

In a case where a leakage of the refrigerant has occurred as an abnormality in the air-conditioning refrigerant circuit 31, while heat exchange capability of the air-conditioning refrigerant circuit 31 may be lowered, it is possible to cover shortfall of cooling of the battery by restricting air conditioning carried out by the air-conditioning refrigerant circuit 31. This enables cooling of the battery in a state which is as appropriate as possible upon occurrence of an abnormality.

Under a situation where the air-conditioning request and the battery cooling request have occurred and it is determined that an abnormality has occurred in the air-conditioning refrigerant circuit 31, air conditioning is restricted in response to it being not possible to satisfy both the air-conditioning request and the battery cooling request even if output of the compressor 33 is increased. In this case, it is possible to appropriately restrict air conditioning while continuing cooling of the battery by taking into account a drive state of the compressor and a situation where the air-conditioning request and the battery cooling request have occurred.

Restriction on air conditioning is lifted or a degree of restriction on air conditioning is lowered in response to the vehicle speed being higher than the speed threshold THC. Given that heat dissipation of the condenser 34 is performed by traveling wind in a case where vehicle speed is high, it is possible to switch from a state where air conditioning is stopped as restriction on air conditioning to a state where air conditioning is implemented.

The following process may be performed as measures against occurrence of an abnormality due to a leakage of the refrigerant. The air conditioning may be restricted while (i) the amount of the part of the refrigerant that flows through the first circulation path L1; and (ii) the amount of the remaining part of the refrigerant that flows through the second circulation path L2, being adjusted, based on the temperature of the battery. Specifically, the control device 60 adjusts the amount of the part of the refrigerant that flows through the first circulation path L1 (L1 refrigerant amount) and the amount of the remaining part of the refrigerant that flows through the second circulation path L2 (L2 refrigerant amount) based on a relationship in FIG. 8, when an abnormality due to a leakage of the refrigerant has occurred. Note that the present process may be implemented, for example, in step S91 in FIG. 15.

Figure 16:
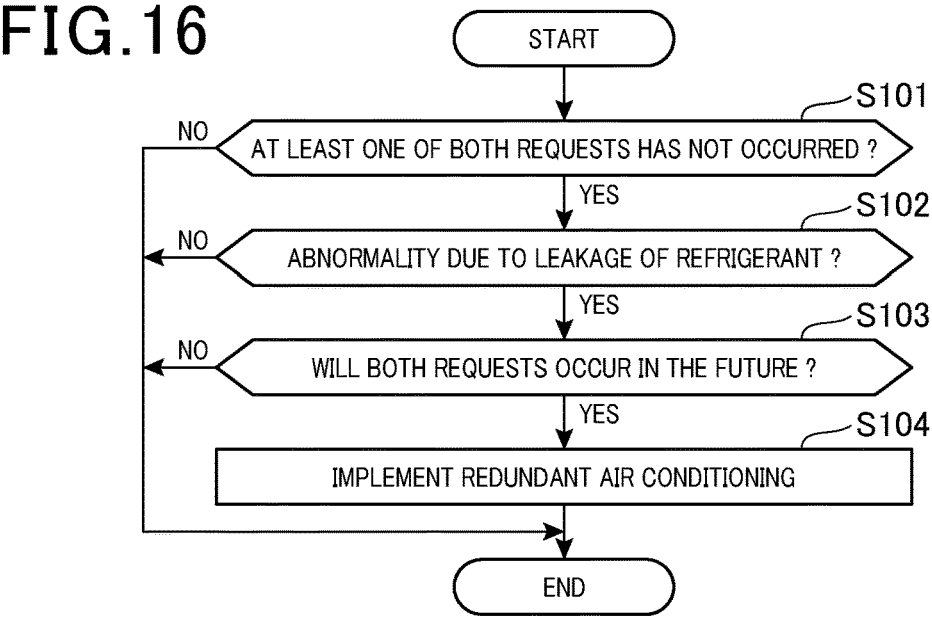
FIG. 16 is a flowchart illustrating a procedure of a battery cooling process in another example.

Taking into account that both the air-conditioning request and the battery cooling request will occur at and after the present time when an abnormality of a leakage of the refrigerant has occurred, redundant air-conditioning that is redundant for presently needed air-conditioning may be carried out. FIG. 16 is a flowchart for explaining such a process. The present process is performed by the control device 60 with a predetermined period.

In FIG. 16, it is determined in step S101 whether the current condition is a condition where at least one of the air-conditioning request and the battery cooling request has not occurred, and it is determined in the subsequent step S102 whether an abnormality due to a leakage of the refrigerant has occurred. In a case where a positive result is obtained in both step S101 and step S102, the process proceeds to step S103. In step S103, it is predicted whether both the air-conditioning request and the battery cooling request will occur based on predicted future traveling of the vehicle from the present time. In this event, it is possible to predict that both the air-conditioning request and the battery cooling request will occur in the future from change of an outdoor air temperature at and after the present time and a traveling condition such as high-speed traveling while the vehicle is traveling. Further, it is also possible to predict that both of the air-conditioning request and the battery cooling request cannot be satisfied in the future at a time point of occurrence of an abnormality due to a leakage of the refrigerant (abnormality in the air-conditioning refrigerant circuit 31).

Thereafter, in step S104, redundant air-conditioning that is redundant for presently needed air-conditioning is carried out before both the air-conditioning request and the battery cooling request occur. In this case, in a case where air conditioning has already been performed in response to the air-conditioning request, air conditioning inside a passenger compartment (cooling) is turned up compared to air conditioning at the present time, for example, a set temperature of air conditioning is lowered. Further, in a case where air conditioning is not performed, air conditioning (cooling) is started regardless of whether the air-conditioning request is currently present. Note that a future timing at which both the air-conditioning request and the battery cooling request will occur may be predicted based on predicted traveling of the vehicle, and the air conditioning in excess of a request at a present time may be started at a timing in advance of the future timing by a predetermined period.

According to the above-described configuration, it is possible to achieve improvement of a passenger compartment environment by carrying out redundant air-conditioning that is redundant for presently needed air-conditioning before both the air-conditioning request and the battery cooling request occur.

It is also possible to use a value other than the pressure of the refrigerant inside the refrigerant passage 32 as the control parameter. For example, an energization current of the compressor may be acquired as the control parameter because the drive state of the compressor 33 changes in accordance with the energization current of the compressor 33. In this case, it may be determined that the pressure of the refrigerant rises after a stopping failure in the heat dissipation fan 36 has occurred, for example, based on the energization current of the compressor detected by the current sensor 65, and the degree of restriction on driving of the compressor 33 may be adjusted based on the determination result. Other than this, torque of the compressor or output of the compressor may be acquired as the control parameter.

The electrically operated compressor 33 may employ a configuration where the drive state is controlled by making an amount of the refrigerant discharge per one rotation variable as well as a configuration where the drive state is controlled by making the rotation speed variable.

A mechanical compressor which is driven by power of the engine 11 may be used as the compressor of the air-conditioning refrigerant circuit 31, in place of the electrically operated compressor 33. In the present configuration, a rotation axis of the compressor is coupled to an output axis of the engine 11 via a coupling member such as a belt, and the compressor is driven in association with rotation of the engine 11. In this case, for example, a multistage or continuously variable transmission is provided at a rotation input unit of the compressor, so that the rotation speed of the compressor can be controlled by control of the transmission. Then, the compressor may be driven in a state where driving is restricted (a state where the rotation speed is limited) under a situation where the battery cooling request has occurred, and it is determined that an abnormality has occurred in the air-conditioning refrigerant circuit 31.

Vehicle-mounted electric component to which power is supplied from the battery 51 may be an equipment other than the rotating electrical machine 21, and may be, for example, various kinds of auxiliary machine such as a heater which warms the passenger compartment, a heater which heats a catalyst which purifies exhaust gas, or the like, and an electric pump.

A vehicle which can be applied in the present disclosure may be a vehicle other than a hybrid vehicle, and may be, for example, a vehicle including an internal combustion engine as a traveling power source, an electric vehicle including rotating electrical machine as a traveling power source, and a fuel cell vehicle.

The control unit and the method described in the present disclosure may be implemented with a dedicated computer including a processor which is programmed to execute one or more functions embodied by a computer program, and a memory. Alternatively, the control unit and the method described in the present disclosure may be implemented with a dedicated computer including a processer constituted with one or more dedicated hardware logic circuits. Alternatively, the control unit and the method described in the present disclosure may be implemented with one or more dedicated computers constituted with combination of a processor which is programmed to execute one or more functions and a memory, and a processor constituted with one or more hardware logic circuits. Further, the computer program may be stored in a computer-readable non-transitory tangible recording medium as an instruction to be executed by the computer.

While the present disclosure has been described with reference to the examples, it is understood that the present disclosure is not limited to the examples and structures. The present disclosure incorporates various modified examples and modifications within an equivalent range. In addition, various combinations, forms, and other combinations and forms including only one element or more or less elements fall within the scope and the scope of mind of the present disclosure.

What is claimed is:

1. A control device for controlling, in response to an air-conditioning request and a battery cooling request, a drive state of a compressor that compresses a refrigerant and is included in an air-conditioning refrigerant circuit of a vehicle-mounted cooling system, the air-conditioning refrigerant circuit including, in addition to the compressor, a refrigerant passage in which the refrigerant circulates, a heat source-side heat exchanger, and a use-side heat exchanger, the vehicle-mounted cooling system including, in addition to the air-conditioning refrigerant circuit, a battery that supplies power to a vehicle-mounted electric component, and a battery cooling unit that cools the battery using the refrigerant circulated in the refrigerant passage, the control device comprising:
an abnormality determination unit configured to determine whether an abnormality has occurred in the air-conditioning refrigerant circuit; and
a control mode change unit configured to perform, under a situation where the battery cooling request has occurred and it is determined that an abnormality has occurred in the air-conditioning refrigerant circuit, a change of a refrigerant-circulation control mode while permitting the battery cooling unit to continuously cool the battery based on the circulated refrigerant, the refrigerant-circulation control mode representing how the refrigerant is circulated in the air-conditioning refrigerant circuit, wherein
the control mode change unit is configured to perform, as the change of the refrigerant-circulation control mode, restriction of a rise in a pressure of the refrigerant in the refrigerant passage as compared with before it is determined that an abnormality has occurred.

2. A control device for controlling, in response to an air-conditioning request and a battery cooling request, a drive state of a compressor that compresses a refrigerant and is included in an air-conditioning refrigerant circuit of a vehicle-mounted cooling system, the air-conditioning refrigerant circuit including, in addition to the compressor, a refrigerant passage in which the refrigerant circulates, a heat source-side heat exchanger, and a use-side heat exchanger, the vehicle-mounted cooling system including, in addition to the air-conditioning refrigerant circuit, a battery that supplies power to a vehicle-mounted electric component, and a battery cooling unit that cools the battery using the refrigerant circulated in the refrigerant passage, the control device comprising:
an abnormality determination unit configured to determine whether an abnormality has occurred in the air-conditioning refrigerant circuit; and
a control mode change unit configured to perform, under a situation where the battery cooling request has occurred and it is determined that an abnormality has occurred in the air-conditioning refrigerant circuit, a change of a refrigerant-circulation control mode while permitting the battery cooling unit to continuously cool the battery based on the circulated refrigerant, the refrigerant-circulation control mode representing how the refrigerant is circulated in the air-conditioning refrigerant circuit, wherein
the control mode change unit is configured to:
perform, as the change of the refrigerant-circulation control mode, a restriction of a rise in a pressure of the refrigerant in the refrigerant passage, and
perform a restriction of driving of the compressor to thereby prevent the pressure of the refrigerant in the refrigerant passage from rising beyond a predetermined high-pressure upper limit value.

3. The control device for the vehicle-mounted cooling system according to claim 1, further comprising:
an air-conditioning restriction unit configured to perform restriction of air conditioning carried out by the air-conditioning refrigerant circuit when the control mode change unit performs, as the change of the refrigerant-circulation control mode, the restriction of the rise in the pressure of the refrigerant in the refrigerant passage.

4. The control device for the vehicle-mounted cooling system according to claim 3, wherein
the refrigerant passage includes a bypass passage provided in parallel to the use-side heat exchanger, the bypass passage enabling the refrigerant to be supplied to the battery cooling unit therethrough;
the refrigerant passage includes a first circulation path that includes the use-side heat exchanger, and a second circulation path that includes the bypass passage that bypasses the use-side heat exchanger, the refrigerant passage being configured to select at least one of the first circulation path and the second circulation path through which the refrigerant flows; and
the air-conditioning restriction unit is configured to perform, as the restriction of the air-conditioning, a task of causing the refrigerant to flow through the second circulation path while restricting flow of the refrigerant through the first circulation path.

5. The control device for the vehicle-mounted cooling system according to claim 4, wherein
the air-conditioning restriction unit is configured to perform the restriction of the air-conditioning while adjusting, based on a temperature of the battery, (i) an amount of a part of the refrigerant that flows through the first circulation path; and (ii) an amount of a remaining part of the refrigerant that flows through the second circulation path.

6. The control device for the vehicle-mounted cooling system according to claim 3, wherein
the air-conditioning restriction unit is configured to perform, in response to determination that a traveling speed of a vehicle is higher than a predetermined speed threshold, one of:
cancelling of the restriction of the air conditioning; and
lowering of a degree of the restriction of the air conditioning.

7. The control device for the vehicle-mounted cooling system according to claim 3, wherein
the control mode change unit is configured to, while performing the restriction of the rise in the pressure of the refrigerant, lower a degree of the restriction of the rise in the pressure of the refrigerant in response to determination that a traveling speed of a vehicle is higher than a predetermined first speed threshold; and
the air-conditioning restriction unit is configured to lower a degree of the restriction of the air conditioning in response to determination that the traveling speed of the vehicle is higher than a second speed threshold that is higher than the first speed threshold.

8. A control device for controlling, in response to an air-conditioning request and a battery cooling request, a drive state of a compressor that compresses a refrigerant and is included in an air-conditioning refrigerant circuit of a vehicle-mounted cooling system, the air-conditioning refrigerant circuit including, in addition to the compressor, a refrigerant passage in which the refrigerant circulates, a heat source-side heat exchanger, and a use-side heat exchanger, the vehicle-mounted cooling system including, in addition to the air-conditioning refrigerant circuit, a battery that supplies power to a vehicle-mounted electric component, and a battery cooling unit that cools the battery using the refrigerant circulated in the refrigerant passage,
the control device comprising:

an abnormality determination unit configured to determine whether an abnormality has occurred in the air-conditioning refrigerant circuit; and
a control mode change unit configured to perform, under a situation where the battery cooling request has occurred and it is determined that an abnormality has occurred in the air-conditioning refrigerant circuit, a change of a refrigerant-circulation control mode while permitting the battery cooling unit to continuously cool the battery based on the circulated refrigerant, the refrigerant-circulation control mode representing how the refrigerant is circulated in the air-conditioning refrigerant circuit, wherein
the control mode change unit is configured to, while performing, as the change of the refrigerant-circulation control mode, restriction of a rise in a pressure of the refrigerant, lower a degree of the restriction of the rise in the pressure of the refrigerant in response to determination that a traveling speed of a vehicle is higher than a predetermined speed threshold.

9. A control device for controlling, in response to an air-conditioning request and a battery cooling request, a drive state of a compressor that compresses a refrigerant and is included in an air-conditioning refrigerant circuit of a vehicle-mounted cooling system, the air-conditioning refrigerant circuit including, in addition to the compressor, a refrigerant passage in which the refrigerant circulates, a heat source-side heat exchanger, and a use-side heat exchanger, the vehicle-mounted cooling system including, in addition to the air-conditioning refrigerant circuit, a battery that supplies power to a vehicle-mounted electric component, and a battery cooling unit that cools the battery using the refrigerant circulated in the refrigerant passage,
the control device comprising:
an abnormality determination unit configured to determine whether an abnormality has occurred in the air-conditioning refrigerant circuit;
a control mode change unit configured to perform, under a situation where the battery cooling request has occurred and it is determined that an abnormality has occurred in the air-conditioning refrigerant circuit, a change of a refrigerant-circulation control mode while permitting the battery cooling unit to continuously cool the battery based on the circulated refrigerant, the refrigerant-circulation control mode representing how the refrigerant is circulated in the air-conditioning refrigerant circuit; and
a prediction unit configured to predict, under a situation where no battery cooling request has occurred and it is determined that an abnormality has occurred, whether the battery cooling request will occur based on a predicted future traveling of the vehicle from a present time, wherein
the control mode change unit is configured to perform the change of the refrigerant-circulation control mode in response to determination that the battery cooling request will occur.

10. The control device for the vehicle-mounted cooling system according to claim 9, wherein
the electric component is a rotating electrical machine that serves as a power source for causing a vehicle to travel; and
the prediction unit is configured to predict whether the battery cooling request will occur based on a travel destination of the vehicle.

11. The control device for the vehicle-mounted cooling system according to claim 9, wherein the control mode change unit is configured to:
perform, as the change of the refrigerant-circulation control mode, restriction of a rise in a pressure of the refrigerant in the refrigerant passage; and
increase a degree of the restriction of the rise in the pressure of the refrigerant in response to determination that the battery cooling request will occur to be larger than that in response to determination that the battery cooling request has occurred.

12. The control device for the vehicle-mounted cooling system according to claim 1, wherein
the control mode change unit includes:
an air-conditioning restriction unit configured to perform, as the change of the refrigerant-circulation control mode, a restriction of air conditioning carried out by the air-conditioning refrigerant circuit.

13. The control device for the vehicle-mounted cooling system according to claim 12, wherein
the air-conditioning restriction unit is configured to perform, under the situation where the battery cooling request and the air-conditioning request have occurred and it is determined that an abnormality has occurred in the air-conditioning refrigerant circuit, restriction of the air conditioning carried out by the air-conditioning refrigerant circuit.

14. A control device for controlling, in response to an air-conditioning request and a battery cooling request, a drive state of a compressor that compresses a refrigerant and is included in an air-conditioning refrigerant circuit of a vehicle-mounted cooling system, the air-conditioning refrigerant circuit including, in addition to the compressor, a refrigerant passage in which the refrigerant circulates, a heat source-side heat exchanger, and a use-side heat exchanger, the vehicle-mounted cooling system including, in addition to the air-conditioning refrigerant circuit, a battery that supplies power to a vehicle-mounted electric component, and a battery cooling unit that cools the battery using the refrigerant circulated in the refrigerant passage,
the control device comprising:
an abnormality determination unit configured to determine whether an abnormality has occurred in the air-conditioning refrigerant circuit; and
a control mode change unit configured to perform, under a situation where the battery cooling request has occurred and it is determined that an abnormality has occurred in the air-conditioning refrigerant circuit, a change of a refrigerant-circulation control mode while permitting the battery cooling unit to continuously cool the battery based on the circulated refrigerant, the refrigerant-circulation control mode representing how the refrigerant is circulated in the air-conditioning refrigerant circuit,
wherein the control mode change unit includes:
an air-conditioning restriction unit configured to perform, as the change of the refrigerant-circulation control mode, a restriction of air conditioning carried out by the air-conditioning refrigerant circuit,
wherein the air-conditioning restriction unit is configured to perform, under the situation where the battery cooling request and the air-conditioning request have occurred and it is determined that an abnormality has occurred in the air-conditioning refrigerant circuit, restriction of the air conditioning carried out by the air-conditioning refrigerant circuit,
wherein the control device further comprises a prediction unit configured to predict, under a situation where at least one of the battery cooling request and the air-conditioning request has not occurred and it is determined that an abnormality has occurred, whether both the battery cooling request and the air-conditioning request will occur based on a predicted future traveling of the vehicle from a present time, and wherein the control mode change unit is configured to permit the air-conditioning refrigerant circuit to carry out redundant air-conditioning that is redundant for presently needed air-conditioning.

15. A control device for controlling, in response to an air-conditioning request and a battery cooling request, a drive state of a compressor that compresses a refrigerant and is included in an air-conditioning refrigerant circuit of a vehicle-mounted cooling system, the air-conditioning refrigerant circuit including, in addition to the compressor, a refrigerant passage in which the refrigerant circulates, a heat source-side heat exchanger, and a use-side heat exchanger, the vehicle-mounted cooling system including, in addition to the air-conditioning refrigerant circuit, a battery that supplies power to a vehicle-mounted electric component, and a battery cooling unit that cools the battery using the refrigerant circulated in the refrigerant passage, the control device comprising:
an abnormality determination unit configured to determine whether an abnormality has occurred in the air-conditioning refrigerant circuit; and
a control mode change unit configured to perform, under a situation where the battery cooling request has occurred and it is determined that an abnormality has occurred in the air-conditioning refrigerant circuit, a change of a refrigerant-circulation control mode while permitting the battery cooling unit to continuously cool the battery based on the circulated refrigerant, the refrigerant-circulation control mode representing how the refrigerant is circulated in the air-conditioning refrigerant circuit, wherein:
the control mode change unit includes:
an air-conditioning restriction unit configured to perform, as the change of the refrigerant-circulation control mode, a restriction of air conditioning carried out by the air-conditioning refrigerant circuit;
the refrigerant passage includes a bypass passage provided in parallel to the use-side heat exchanger, the bypass passage enabling the refrigerant to be supplied to the battery cooling unit therethrough;
the refrigerant passage includes a first circulation path that includes the use-side heat exchanger, and a second circulation path that includes the bypass passage that bypasses the use-side heat exchanger, the refrigerant passage being configured to select at least one of the first circulation path and the second circulation path through which the refrigerant flows; and
the air-conditioning restriction unit is configured to perform, as the restriction of the air-conditioning, a task of causing the refrigerant to flow through the second circulation path while restricting flow of the refrigerant through the first circulation path.

16. The control device for the vehicle-mounted cooling system according to claim 15, wherein
the air-conditioning restriction unit is configured to perform the restriction of the air-conditioning while adjusting, based on a temperature of the battery, (i) an amount of a part of the refrigerant that flows through the first circulation path; and (ii) an amount of a remaining part of the refrigerant that flows through the second circulation path.

17. The control device for the vehicle-mounted cooling system according to claim 12, wherein
the air-conditioning restriction unit is configured to perform, in response to determination that a traveling speed of a vehicle is higher than a predetermined speed threshold, one of:
cancelling of the restriction of the air conditioning; and
lowering of a degree of the restriction of the air conditioning.

18. The control device for the vehicle-mounted cooling system according to claim 1, further comprising:
a parameter acquisition unit configured to acquire a drive state of the compressor or the pressure of the refrigerant in the refrigerant passage as a control parameter,
wherein the control mode change unit changes the control mode based on the control parameter after the abnormality has occurred.

19. A control device for controlling, in response to an air-conditioning request and a battery cooling request, a drive state of a compressor that compresses a refrigerant and is included in an air-conditioning refrigerant circuit of a vehicle-mounted cooling system, the air-conditioning refrigerant circuit including, in addition to the compressor, a refrigerant passage in which the refrigerant circulates, a heat source-side heat exchanger, and a use-side heat exchanger, the vehicle-mounted cooling system including, in addition to the air-conditioning refrigerant circuit, a battery that supplies power to a vehicle-mounted electric component, and a battery cooling unit that cools the battery using the refrigerant circulated in the refrigerant passage, the control device comprising:
an abnormality determination unit configured to determine whether an abnormality has occurred in the air-conditioning refrigerant circuit; and
a control mode change unit configured to perform, under a situation where the battery cooling request has occurred and it is determined that an abnormality has occurred in the air-conditioning refrigerant circuit, a change of a refrigerant-circulation control mode while permitting the battery cooling unit to continuously cool the battery based on the circulated refrigerant, the refrigerant-circulation control mode representing how the refrigerant is circulated in the air-conditioning refrigerant circuit,
wherein the abnormality determination unit determines that an abnormality has occurred in the air-conditioning refrigerant circuit in response to at least one of a first abnormality, a second abnormality, and a third abnormality having occurred in the air-conditioning refrigerant circuit,
the first abnormality representing a heat dissipation fan being stopped or output of the heat dissipation fan being reduced, the heat dissipation fan blowing air to the heat source-side heat exchanger,
the second abnormality representing an abnormality of heat dissipation due to blockage of the heat source-side heat exchanger, and
the third abnormality representing an abnormality due to a leakage of the refrigerant in the air-conditioning refrigerant circuit.

20. A vehicle-mounted cooling system comprising:
the air-conditioning refrigerant circuit;
the battery;
the battery cooling unit; and
the control device according to claim 1.

* * * * *